(12) United States Patent
Witkin et al.

(10) Patent No.: US 11,230,026 B2
(45) Date of Patent: *Jan. 25, 2022

(54) DEVICE, SYSTEM AND METHOD FOR MAKING CUSTOM PRINTED PRODUCTS

(71) Applicant: StickerYou Inc., Toronto (CA)

(72) Inventors: Andrew Witkin, Toronto (CA); Tamer El Shazli, Oakville (CA); Piragath Mahalingam, Toronto (CA)

(73) Assignee: StickerYou Inc., Toronto (CA)

( * ) Notice: Subject to any disclaimer, the term of this patent is extended or adjusted under 35 U.S.C. 154(b) by 536 days.

This patent is subject to a terminal disclaimer.

(21) Appl. No.: 16/259,350

(22) Filed: Jan. 28, 2019

(65) Prior Publication Data

US 2019/0160700 A1    May 30, 2019

Related U.S. Application Data

(63) Continuation-in-part of application No. 12/750,078, filed on Mar. 30, 2010, now Pat. No. 10,192,222.
(Continued)

(51) Int. Cl.
*G06F 16/335* (2019.01)
*B26D 5/00* (2006.01)
(Continued)

(52) U.S. Cl.
CPC .............. *B26D 5/007* (2013.01); *B26D 3/085* (2013.01); *B26F 1/38* (2013.01); *B31D 1/026* (2013.01);
(Continued)

(58) Field of Classification Search
CPC .. B41J 3/4075; G09F 3/00; G09F 3/02; G09F 3/10; G09F 3/0288; G07D 7/2033; B65D 2203/02
(Continued)

(56) References Cited

U.S. PATENT DOCUMENTS 5,218,846 A    6/1993  Cook et al.
5,615,123 A    3/1997  Davidson et al.
(Continued)

OTHER PUBLICATIONS

Office Action; U.S. Appl. No. 12/750,078, filed Dec. 23, 2011.
(Continued)

*Primary Examiner* — Alex Gofman
*Assistant Examiner* — Linh Black
(74) *Attorney, Agent, or Firm* — Ridout and Maybee LLP

(57) ABSTRACT

A device, system and method for making custom printed products. In one embodiment of the method, an image is received from a user device along with a size of for the printed product. Pixel edge detection is performed on the image to generate a plurality of polygons corresponding to all shapes in the image. Polygons below a size threshold are removed. An offset is applied to each polygon. The polygons are combined. A smoothing algorithm is applied to the combined polygon. A set of curves that define the smoothed polygon is determined. A cut path is dynamically generating for the printed product in real-time in dependence on the set of curves and the received size so that the cut path has a shape dependent on the set of curves and a size dependent on the received size. The image is printed on a substrate material for the image product in dependence on the received size and the offset so that the printed image has a printed size equal to the received size less the offset. The substrate is cut in dependence on the cut path.

19 Claims, 22 Drawing Sheets

Related U.S. Application Data

(60) Provisional application No. 61/164,746, filed on Mar. 30, 2009, provisional application No. 61/300,288, filed on Feb. 1, 2010.

(51) Int. Cl.

| | | |
|---|---|---|
| *G06T 5/00* | (2006.01) | |
| *G06T 11/60* | (2006.01) | |
| *B31D 1/02* | (2006.01) | |
| *B26F 1/38* | (2006.01) | |
| *B26D 3/08* | (2006.01) | |
| *B65H 35/00* | (2006.01) | |
| *B65H 35/04* | (2006.01) | |
| *B65H 35/02* | (2006.01) | |
| *B41J 3/407* | (2006.01) | |
| *B41J 11/70* | (2006.01) | |
| *G06T 7/13* | (2017.01) | |
| *B41J 11/66* | (2006.01) | |

(52) U.S. Cl.
 CPC ........... *B31D 1/027* (2013.01); *B41J 3/4075* (2013.01); *B41J 11/663* (2013.01); *B41J 11/70* (2013.01); *B65H 35/0086* (2013.01); *B65H 35/02* (2013.01); *B65H 35/04* (2013.01); *G06T 5/002* (2013.01); *G06T 7/13* (2017.01); *G06T 11/60* (2013.01); *B31D 1/021* (2013.01); *B31D 2201/02* (2013.01); *G06T 2207/20024* (2013.01)

(58) Field of Classification Search
 USPC ............... 707/716, 754, 793, 803, 804, 805, 707/E17.019, E17.02, E17.021, E17.022, 707/E17.023, E17.024, E17.109
 See application file for complete search history.

(56) References Cited

U.S. PATENT DOCUMENTS

| | | | |
|---|---|---|---|
| 5,621,864 A | 4/1997 | Bemade et al. | |
| 5,682,886 A | 11/1997 | Delp et al. | |
| 5,829,790 A * | 11/1998 | Phillips | B42D 15/042 283/117 |
| 6,125,374 A | 9/2000 | Terry et al. | |
| 6,167,382 A | 12/2000 | Sparks et al. | |
| 6,256,039 B1 | 7/2001 | Krishnamurthy | |
| 6,408,132 B1 | 6/2002 | Ishikawa | |
| 6,452,596 B1 | 9/2002 | Gueziec et al. | |
| 6,565,607 B1 | 5/2003 | Cox | |
| 6,594,927 B2 * | 7/2003 | Witkowski | G09F 3/0288 40/306 |
| 6,619,166 B2 | 9/2003 | Miyazaki et al. | |
| 7,011,230 B2 | 3/2006 | Seo | |
| 7,032,179 B2 | 4/2006 | Mack et al. | |
| 7,117,211 B2 | 10/2006 | Whittingham et al. | |
| 7,283,277 B2 | 10/2007 | Li | |
| 7,627,174 B1 | 12/2009 | Adams et al. | |
| 8,505,978 B1 * | 8/2013 | Leon | G06Q 30/0621 283/71 |
| 2001/0011279 A1 | 8/2001 | Hajjar | |
| 2002/0031262 A1 | 3/2002 | Imagawa et al. | |
| 2002/0054115 A1 | 5/2002 | Mack | |
| 2002/0175988 A1 | 11/2002 | Hoover | |
| 2003/0034991 A1 | 2/2003 | Fitzsimons et al. | |
| 2003/0140315 A1 | 7/2003 | Blumbert et al. | |
| 2004/0057747 A1 * | 3/2004 | Michlin | G03G 15/0884 399/106 |
| 2004/0070587 A1 | 4/2004 | Cosman | |
| 2004/0083631 A1 | 5/2004 | Zakova et al. | |
| 2004/0120008 A1 * | 6/2004 | Morgan | H04N 1/0019 358/1.18 |
| 2004/0200106 A1 * | 10/2004 | Campbell | G09F 3/10 40/638 |
| 2004/0258201 A1 | 12/2004 | Hayashida | |
| 2005/0061430 A1 | 3/2005 | Frazer | |
| 2005/0182693 A1 | 8/2005 | Alivandi | |
| 2005/0289018 A1 * | 12/2005 | Sullivan | G06Q 30/00 705/26.5 |
| 2007/0034545 A1 | 2/2007 | Sabalaskey et al. | |
| 2007/0097396 A1 | 5/2007 | Jacquot | |
| 2007/0115299 A1 | 5/2007 | Barney et al. | |
| 2007/0115300 A1 | 5/2007 | Barney et al. | |
| 2007/0126226 A1 | 6/2007 | Kolodzie et al. | |
| 2008/0162271 A1 | 7/2008 | Benjamin | |
| 2008/0189609 A1 * | 8/2008 | Larson | G06F 40/103 715/273 |
| 2009/0023487 A1 | 1/2009 | Gilson et al. | |
| 2009/0122329 A1 | 5/2009 | Hegemier | |
| 2009/0185212 A1 | 7/2009 | Gustafson | |
| 2011/0240739 A1 | 10/2011 | Delaigle | |

OTHER PUBLICATIONS

Final Office Action; U.S. Appl. No. 12/750,078, filed Aug. 3, 2012.
Advisory Action; U.S. Appl. No. 12/750,078, filed Oct. 23, 2012.
Office Action; U.S. Appl. No. 12/750,078, filed Jun. 18, 2014.
Final Office Action; U.S. Appl. No. 12/750,078, filed Feb. 4, 2015.
Office Action; U.S. Appl. No. 12/750,078, filed Dec. 7, 2015.
Final Office Action; U.S. Appl. No. 12/750,078, filed Jul. 12, 2016.
Advisory Action; U.S. Appl. No. 12/750,078, filed Sep. 27, 2016.
Office Action; U.S. Appl. No. 12/750,078, filed Jan. 13, 2017.
Final Office Action; U.S. Appl. No. 12/750,078, filed Jul. 14, 2017.
Advisory Action; U.S. Appl. No. 12/750,078, filed Dec. 21, 2017.
Office Action; CA Application No. 2698052 dated Feb. 20, 2017.
Office Action; CA Application No. 2698052 dated Mar. 1, 2018.
Office Action; CA Application No. 2698052 dated Oct. 17, 2018.

\* cited by examiner

DEVICE, SYSTEM AND METHOD FOR MAKING CUSTOM PRINTED PRODUCTS

RELATED APPLICATION DATA

The present application is a continuation-in-part of non-provisional U.S. patent application Ser. No. 12/750,078, filed Mar. 30, 2010, which claims priority to and the benefit of provisional U.S. patent application Ser. No. 61/300,288, filed Feb. 1, 2010 and provisional U.S. patent application Ser. No. 61/164,746, filed Mar. 30, 2009, the entire contents of each of these documents being incorporated herein by reference.

TECHNICAL FIELD

The present disclosure relates to a device, system and method for making custom printed products.

BACKGROUND

Systems for making custom printed products typically restrict the shape and/or size of the printed product to templates which fix the shape and/or size of the printed product, typically for simplicity and/or cost efficiency of the printed product maker. For example, a preset template may be a 4 inch by 2 inch rectangle. Although some systems may permit the selected template to be changed, changes to the template are typically not permitted later stages of the design procedure, requiring the design procedure to be largely or entirely restarted. This is time consuming, inefficient and frustrating for users. In addition, the use of templates in any form, even if a large number of templates is available, inherently limits the shape and/or size of the printed product. Thus, there remains a need for an improved device, system and method for making custom printed products which allows greater customization of the printed products.

Systems for making custom printed product are also typically designed for production of a single item at a time, often in large production runs. There is a need for improved device, system and method for making custom printed products that allows more efficient production of the printed products.

DETAILED DESCRIPTION OF EXAMPLE EMBODIMENTS

Figure 1:
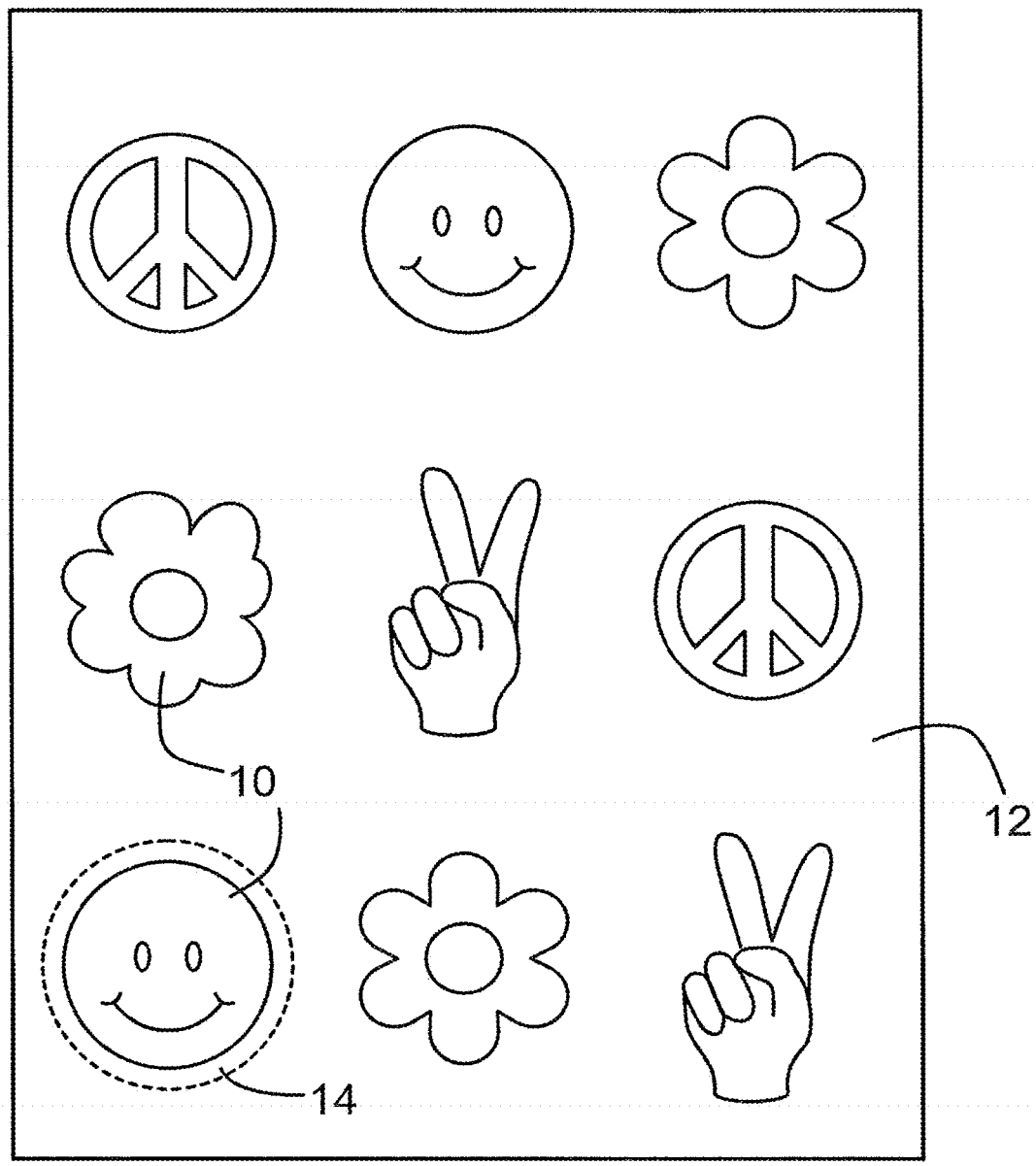
FIG. 1 illustrates a sample sheet of stickers made in accordance with an embodiment of the method and system of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

The present disclosure provides a device, system and method for making custom printed products that allows the content of the image to be customized by a user based on one or a combination of user-provided images, added text (e.g., vector graphics based text) or images selected from an image asset database 220. The size and shape of the printed products is determined by the user. A dynamic preview of the printed products is provided during the design and order process.

In accordance with a first aspect of the present disclosure, there is provided an easy-to-use method and system for producing high quality customizable stickers in both print and cutting (the shape of how the image is cut) for an inexperienced user to produce a custom sticker or series of custom stickers from any computer having access to the internet. The method and system also allows the user to use any number of unspecified images which can be uploaded from the user's computer, downloaded from any unified resource locator (URL), and/or downloaded or imported from the provider's protected assets. The method and system of the present disclosure provides a user interface, offline tools, API, services, and interoperability methods to create stickers, define and customize the die-cut of the sticker (shape of the sticker), automatically detect the die-cut of imported/uploaded images, combine and optimize the final die-cut and also provides the ability to create and order a combined sheet of variable stickers with customized shapes and die-cuts at once as a single order.

In accordance with another aspect of the present disclosure, there is provided a method and system to facilitate and automate the process of automatically detecting the die-cut (shape) of any unspecified image or and/or object embedded within the sticker printing layer. The method and system of the present disclosure provides an automatic and cost-effective process of translating and generating the user's actions to produce the stickers into high-quality machine readable form that produces the final product in a mass production manner without (or with minimal) human intervention and manual labour.

In accordance with a further aspect of the present disclosure, there is provided a method and system for producing stickers in any shape or form, from any number of objects, from any kind of objects (raster images (e.g. photos), vector images, text, drawing shapes, hand/free drawing), protecting any high resolution and protected assets (by means of conversion to screen resolution for the user tools), in a fully automated or semi-automated manner, in a cost effective manger of mass production of customized pieces per user.

In accordance with a further aspect of the present disclosure, there is provided a user interface in a network computerized environment comprising a central server that is accessible by a user via the internet from a remote location, the user interface allowing the user to create a sheet of one or more customized stickers, the user interface comprising: a canvas corresponding to the sheet of the one or more customized stickers, a plurality of assets stored in a database on the central server and accessible through the user interface, the assets comprising graphic images, objects and text that can be selected, accessed, combined, modified, transformed, altered or saved by the user, asset tools to allow the user to access, select and save desired assets that are used by the user to create the one or more customized stickers, asset transformation tools to allow the user to place the desired assets on the canvas, and to combine, modify, transform and alter the desired assets so as to create the one or more customized stickers, die-cut tools to create die-cut borders surrounding each of the one or more customized stickers created by the user, and an ordering tool to allow the user to order and print the sheet of customized stickers.

The user interface may also comprise one or more of the following: a page layout tool to allow the user to resize, align or organize the one or more customized stickers on the canvas; an asset uploading tool to allow the user to import and upload a user-generated asset to the database on the central server; an asset alignment tool for automatically resizing, aligning and organizing the one or more customized stickers on the canvas; and means associated with one or more of the assets to prevent the user from combining, modifying, transforming or altering the one or more assets.

In accordance with one embodiment of the present disclosure, there is provided an internet-based method for creating and printing a sheet of one or more customized stickers, the method comprising the steps of: providing a central server that is accessible by a user at a remote location via the internet, the server comprising a database of assets wherein the assets comprise graphic images, objects and text that can be selected, accessed, combined, modified, transformed, altered or saved by the user, providing a canvas corresponding to the sheet of the one or more customized stickers, allowing the user at the remote location to select, access, combine, modify, transform, alter or save desired assets, creating the customized stickers by selecting, accessing, combining, modifying, transforming, altering or saving the desired assets, creating die-cut borders surrounding each of the customized stickers, and printing the sheet of the customized stickers.

The internet-based method may also comprise one or more of the steps of: ordering the sheet of customized stickers prior to printing; resizing, aligning or organizing the one or more customized stickers on the canvas prior to printing; automatically detecting the one or more customized stickers and automatically creating the die-cut borders; importing and uploading a user-generated asset to the database on the central server; and automatically resizing, aligning or organizing the one or more customized stickers on the canvas.

In accordance with one embodiment of the present disclosure, there is provided an internet-based system for creating and printing a sheet of one or more customized stickers, the system comprising: a central server that is accessible by a user at a remote location via the internet, a database of assets stored on the server, wherein the assets comprise graphic images, objects and text that can be selected, accessed, combined, modified, transformed, altered or saved by the user, a canvas corresponding to the sheet of the one or more customized stickers, asset tools to access, select and save desired assets that are used by the user to create the one or more customized stickers, asset transformation tools to place the desired assets on the canvas, and to combine, modify, transform or alter the desired assets so as to create the one or more customized stickers, die-cut tools to create die-cut borders surrounding each of the one or more customized stickers created by the user, and a printer for printing the sheet of the customized stickers.

The internet-based system may also comprise one or more of the following: ordering tools to allow the user to order the sheet of customized stickers prior to printing; organizing tools to allow the user to resize, align or organize the one or more customized stickers on the canvas; means for automatically detecting the one or more customized stickers and automatically creating the die-cut border; uploading tools to allow the user to import and upload a user-generated asset to the database on the central server; means for automatically resizing, aligning or organizing the one or more customized stickers on the canvas; and means associated with one or more of the assets to prevent the user from combining, modifying, transforming or altering the one or more assets.

The die-cut tools allow the user to customize the shape and size of each of the die-cut borders; or the die-cut tools automatically detect the one or more customized stickers and automatically create the die-cut borders.

In accordance with a further aspect of the present disclosure, there is provided a method, performed by a server, for making a sticker. The method comprises: receiving a raster image from a client device over a communications network; receiving input defining a size of the sticker from the client device over the communications network; performing pixel edge detection on the raster image to obtain a plurality of polygons corresponding to all closed shapes in the raster image; applying an offset to each polygon in the plurality of polygons; detecting and removing any polygons below a size threshold; combining the remaining polygons to form a single, combined polygon; detecting and removing any holes defined in an interior of the polygon; applying a polygon smoothing algorithm to the polygon; applying spline approximation to define the polygon as a set of one or more curves; dynamically generating a die-cut border for the sticker in real-time in accordance with the set of one or more curves and received size so that the die-cut border has a shape defined by the set of one or more curves and the received size; printing the raster image on a sticker sheet in accordance with the received size and the offset so that the printed image has a printed size equal to the received size less the offset; and die-cutting the sticker sheet in accordance with the die-cut border.

In accordance with a further aspect of the present disclosure, there is provided a system for making stickers. The system comprises a server, the server comprising a memory and a processor coupled to the memory, wherein the memory has stored executable instructions that, when executed by the processor, cause the server to: receive a raster image from a client device over a communications network; receive input defining a size of the sticker from the client device over the communications network; perform pixel edge detection on the raster image to obtain a plurality of polygons corresponding to all closed shapes in the raster image; apply an offset to each polygon in the plurality of polygons; detect and remove any polygons below a size threshold; combine the remaining polygons to form a single, combined polygon; detect and remove any holes defined in an interior of the polygon; apply a polygon smoothing algorithm to the polygon; apply spline approximation to define the polygon as a set of one or more curves; and dynamically generate a die-cut border for the sticker in real-time in accordance with the set of one or more curves and the received size so that the die-cut border has a shape defined by the set of one or more curves and a size defined by the received size. The system further comprises a printer coupled to the server for printing the raster image on a sticker sheet in accordance with the received size and offset so that the printed image has a size equal to the received size less the offset. The system further comprises a die-cutter coupled to the server for die-cutting the sticker sheet in accordance with the die-cut border.

According to some embodiments of the above aspects and embodiments, the offset is between 0.2 mm and 4.0 mm, and in some embodiments the offset is between 0.5 mm and 2.0 mm.

According to some embodiments of the above aspects and embodiments, the spline approximation is Bezier spline approximation and the curves are Bezier curves.

According to some embodiments of the above aspects and embodiments, the method further comprises: receiving input from the client device over the communications network, the input selecting one or more vector graphics; generating an image asset comprising the raster image and the one or more vector graphics; obtaining a die-cut vector of each vector graphic having a pre-defined die-cut; combining the die-cut vectors to form a single, combined die-cut vector; and applying the offset to the combined die-cut vector to obtain a modified die-cut vector; wherein dynamically generating the die-cut border comprises merging the set of one or more curves and the modified die-cut vector to obtain the die-cut border, wherein the shape of the die-cut border is defined by the result of merging the set of one or more curves and the modified die-cut vector.

According to some embodiments of the above aspects and embodiments, combining the geometry vectors to form the combined die-cut vector comprises: detecting and removing internal shapes defined by the combined die-cut vector.

According to some embodiments of the above aspects and embodiments, the method further comprises: applying a simplification algorithm to the modified die-cut vector.

According to some embodiments of the above aspects and embodiments, the method further comprises: determining a rectangular vector defining an outbound rectangle for each vector graphic that does not have a pre-defined die-cut; combining the rectangular vectors to form a combined rectangular vector; applying the offset to the combined rectangular vector to form a modified rectangular vector; wherein dynamically generating the die-cut border comprises merging the set of one or more curves, the modified die-cut vector and the modified rectangular vector to obtain the die-cut border, wherein the shape of the die-cut border is defined by the result of merging the set of one or more curves, modified die-cut vector and modified rectangular vector.

According to some embodiments of the above aspects and embodiments, the vector graphics having a pre-defined die-cut comprise vector graphic images and the vector graphics that do not have a pre-defined die-cut comprise vector graphic text.

In accordance with a further aspect of the present disclosure, there is provided a method, performed by a server, for making a sticker. The method comprises: receiving input from a client device over a communications network, the input selecting one or more vector graphics; generating an image asset comprising the one or more vector graphics; receiving input defining a size of the sticker from the client device over the communications network; obtaining a die-cut vector of each vector graphic having a pre-defined die-cut; combining the die-cut vectors to form a single, combined die-cut vector; applying an offset to the combined die-cut vector to obtain a modified die-cut vector; determining a rectangular vector defining an outbound rectangle for each vector graphic that does not have a pre-defined die-cut; combining the rectangular vectors to form a combined rectangular vector; applying the offset to the combined rectangular vector to form a modified rectangular vector; merging the modified die-cut vector and the modified rectangular vector; dynamically generating a die-cut border for the sticker in real-time in accordance with the result of merging the modified die-cut vector and the modified rectangular vector and the received size so that the die-cut border has a shape defined by the result of merging the modified die-cut vector and the modified rectangular vector and a size defined by the received size; wherein the vector graphics having a pre-defined die-cut comprise vector graphic images and the vector graphics that do not have a pre-defined die-cut comprise vector graphics text; printing the image asset on a sticker sheet in accordance with the received size information and the offset so that the printed image has a size equal to the received size less the offset; and die-cutting the image asset on the sticker sheet in accordance with the die-cut border.

In accordance with a further aspect of the present disclosure, there is provided a system for making stickers. The system comprises a server, the server comprising a memory and a processor coupled to the memory, wherein the memory has stored executable instructions that, when executed by the processor, cause the server to: receive input from a client device over a communications network, the input selecting one or more vector graphics; generate an image asset comprising the one or more vector graphics; receive input defining a size of the sticker from the client device over the communications network; obtain a die-cut vector of each vector graphic having a pre-defined die-cut; combine the die-cut vectors to form a single, combined die-cut vector; apply an offset to the combined die-cut vector to obtain a modified die-cut vector; determine a rectangular vector defining an outbound rectangle for each vector graphic that does not have a pre-defined die-cut; combine the rectangular vectors to form a combined rectangular vector; apply the offset to the combined rectangular vector to form a modified rectangular vector; merge the modified die-cut vector and the modified rectangular vector; dynamically generate a die-cut border for the sticker in real-time in accordance with the result of merging the modified die-cut vector and the modified rectangular vector and the received size so that the die-cut border has a shape defined by the result of merging the modified die-cut vector and the modified rectangular vector and a size defined by the received size; wherein the vector graphics having a pre-defined die-cut comprise vector graphic images and the vector graphics that do not have a pre-defined die-cut comprise vector graphics text. The system further comprises a printer coupled to the server for printing the image asset on a sticker sheet in accordance with the received size information and the offset so that the printed image has a size equal to the received size less the offset. The system further comprises a die-cutter coupled to the server for die-cutting the image asset on the sticker sheet in accordance with the die-cut border.

According to some embodiments of the above aspects and embodiments, combining the geometry vectors to form the combined die-cut vector comprises: detecting and removing internal shapes defined by the combined die-cut vector.

According to some embodiments of the above aspects and embodiments, the method further comprises: applying a simplification algorithm to the modified die-cut vector.

According to some embodiments of the above aspects and embodiments, the method further comprises: determining a rectangular vector defining an outbound rectangle for each vector graphic that does not have a pre-defined die-cut; combining the rectangular vectors to form a combined rectangular vector; applying the offset to the combined rectangular vector to form a modified rectangular vector; wherein dynamically generating the die-cut border comprises merging the set of one or more curves, the modified die-cut vector and the modified rectangular vector to obtain the die-cut border, wherein the shape of the die-cut border is defined by the result of merging the set of one or more curves, modified die-cut vector and modified rectangular vector.

According to some embodiments of the above aspects and embodiments, the vector graphics having a pre-defined die-cut comprise vector graphic images and the vector graphics that do not have a pre-defined die-cut comprise vector graphic text.

In accordance with a further aspect of the present disclosure, there is provided a computer-implemented method for making a printed product, comprising: receiving, via a communication module of the computer, an image for the printed product; receiving, via the communication module, a size of the printed product; performing pixel edge detection on the image to generate a plurality of polygons corresponding to all shapes in the image; detecting and removing any polygons in the plurality of polygons having a size below a size threshold to generate a reduced set of polygons; applying an offset to each polygon in the reduced set of polygons to generate a set of modified polygons; combining the polygons in the set of modified polygons to generate a combined polygon; applying a smoothing algorithm to the combined polygon; determining a set of one or more curves that define the smoothed polygon; dynamically generating a cut path for the printed product in real-time in dependence on the set of one or more curves and the received size so that the cut path has a shape dependent on the set of one or more curves and a size dependent on the received size; causing a printer to print the image on a substrate material for the image product in dependence on the received size and the offset so that the printed image has a printed size equal to the received size less the offset; and causing a cutter to cut the substrate in dependence on the cut path.

In accordance with a further aspect of the present disclosure, there is provided a computer-implemented method for making a printed product, comprising: receiving, via a communication module of the computer, an image for the printed product; receiving, via the communication module, a size of the printed product; performing pixel edge detection on the image to generate a plurality of polygons corresponding to all shapes in the image; detecting and removing any polygons in the plurality of polygons having a size below a size threshold to generate a reduced set of polygons; combining the polygons in the reduced set of polygons to generate a combined polygon; applying an offset to the combined polygon to generate a modified polygon; applying a smoothing algorithm to the modified polygon; determining a set of one or more curves that define the smoothed polygon; dynamically generating a cut path for the printed product in real-time in dependence on the set of one or more curves and the received size so that the cut path has a shape dependent on the set of one or more curves and a size dependent on the received size; causing a printer to print the image on a substrate material for the image product in dependence on the received size and the offset so that the printed image has a printed size equal to the received size less the offset; and causing a cutter to cut the substrate in dependence on the cut path.

According to some embodiments of the above aspects and embodiments, the method further comprises: dynamically determining the offset in dependence on the received size.

According to some embodiments of the above aspects and embodiments, the printed product is chosen from one of a sticker, a label, a decal, a temporary tattoo, an iron-on, a patch, a ding, a magnet, a badge.

According to some embodiments of the above aspects and embodiments, the printed product has a format chosen from a page with a single design, a page with multiple designs, a roll, a kiss-cut, a die-cut or a transfer.

According to some embodiments of the above aspects and embodiments, the cut path is a kiss-cut or a die-cut.

According to some embodiments of the above aspects and embodiments, the set of one or more curves that define the smoothed polygon are determined by applying spline approximation to the combined polygon. According to some embodiments of the above aspects and embodiments, the spline approximation is Bezier spline approximation and the curves in the set of one or more curves are Bezier curves.

According to some embodiments of the above aspects and embodiments, the smoothing algorithm is a polygon smoothing algorithm.

According to some embodiments of the above aspects and embodiments, the method further comprises: detecting and removing any holes defined in an interior of the combined polygon.

According to some embodiments of the above aspects and embodiments, the method further comprises: generating a dynamic preview of the printed product, the dynamic preview illustrating the image and the cut path; sending the dynamic preview of the printed product to a user device for display thereon via the communication module.

According to some embodiments of the above aspects and embodiments, the method further comprises: receiving, via the communication module, selection of one or more vector graphics; obtaining a cut path for each vector graphic having a pre-defined cut path; combining the cut paths to form a combined vector graphic cut path; and applying the offset to the combined vector graphic cut path to obtain a modified vector graphic cut path; and merging the set of one or more curves and the modified vector graphic cut path to generate the cut path of the printed product, wherein the shape of the cut path of the printed product is defined by the result of merging the set of one or more curves and the modified vector graphic cut path.

According to some embodiments of the above aspects and embodiments, the method further comprises: detecting and removing any internal shapes defined by the combined vector graphic cut path.

According to some embodiments of the above aspects and embodiments, the method further comprises: applying a simplification algorithm to the modified vector graphic cut path.

According to some embodiments of the above aspects and embodiments, the method further comprises: determining a rectangular cut path defined by an outbound rectangle for each vector graphic that does not have a pre-defined cut path; combining the rectangular cut paths to form a combined rectangular cut path; applying the offset to the combined rectangular cut path to form a modified rectangular cut path; and merging the set of one or more curves, the modified vector graphic cut path, and the modified rectangular cut path to generate the cut path of the printed product, wherein the shape of the cut path of the printed product is defined by the result of merging the set of one or more curves, the modified vector graphic cut path, and the modified rectangular cut path.

According to some embodiments of the above aspects and embodiments, the method further comprises: receiving, via the communication module, selection of one or more vector graphics; generating a rectangular cut path defined by an outbound rectangle for each vector graphic that does not have a pre-defined cut path; combining the rectangular cut paths to form a combined rectangular cut path; applying the offset to the combined rectangular cut path to form a modified rectangular cut path; and merging the set of one or more curves and the modified rectangular cut path to generate the cut path of the printed product, wherein the shape of the cut path of the printed product is defined by the result of merging the set of one or more curves and the modified rectangular cut path.

According to some embodiments of the above aspects and embodiments, the vector graphics having a pre-defined cut path comprise vector graphic images and the vector graphics not having a pre-defined cut path comprise vector graphic text.

According to some embodiments of the above aspects and embodiments, the method further comprises: before performing pixel edge detection on the image, decreasing a resolution of the image from a base resolution to a lower resolution.

According to some embodiments of the above aspects and embodiments, the method further comprises: before performing pixel edge detection on the image, applying a filters to the image to reduce an amount of noise and a number of colors in the image.

In accordance with a further aspect of the present disclosure, there is provided a system for making stickers. The system comprises a computer comprising a memory and a processor coupled to the memory, wherein the memory has executable instructions stored thereon that, when executed by the processor, cause the computer to perform the methods described above and herein. The system further comprises a printer coupled to the computer for printing the image on a substrate in dependence on the received size and the offset so that the printed image has a printed size equal to the received size less the offset. The system further comprises a cutter coupled to the computer for cutting the substrate in dependence on the cut path.

In accordance with further aspects of the present disclosure, there is a non-transitory machine readable medium having tangibly stored thereon executable instructions for execution by a processor of a computer, wherein the executable instructions, when executed by the processor, cause the computer to perform the methods described herein.

The present disclosure provides an internet-based method and system for making user-customized printed products such as stickers. FIG. 1 illustrates a sheet 12 of stickers 10. The internet-based method and system of the present disclosure may provide one or more of the following features: (a) allow the user to design a sheet 12 of stickers 10 in an easy and intuitive way; (b) allow the user to order any number of stickers within the same sheet; (c) allow the user to design a single or multiple stickers 10 with intuitive tools that perform sophisticated image processing operations without the knowledge by the user of how these processes are performed; (d) provide to the user an automatically generated defined die-cut 14 (the physical shape of the sticker 10 outlining the shape of the image) by means of single action invocation that performs a complex procedure of actions to detect, enhance, simplify and generate the die-cut 14 of the sticker 10; (e) accept any type of image and in any format by means of: an uploaded image file by the user, imported image file from external sources, linked image file to external sources, serviced image file from external web services. The image is processed according to its format and type, and an automatically defined vector die-cut is generated from either a raster formatted image or a vector formatted image. This feature allows the system implementing the subject patent to process any kind of uploaded images by the end user or imported/linked images to the system by means of web services, API, physical imports, etc. and benefit from the same benefits of assets belonging to the system; (f) allow the user to browse, manipulate and use hi-resolution images and vector images in a unified way without compromising the security of the original images. This feature allows the user to use images that have sufficient resolution to use on the computer screen but do not have sufficient resolution to print directly from the application or to be reused into other applications; and (g) allow the user to merge images and still be able to define a single die-cut 14 for the same sticker 10.

Figure 2:
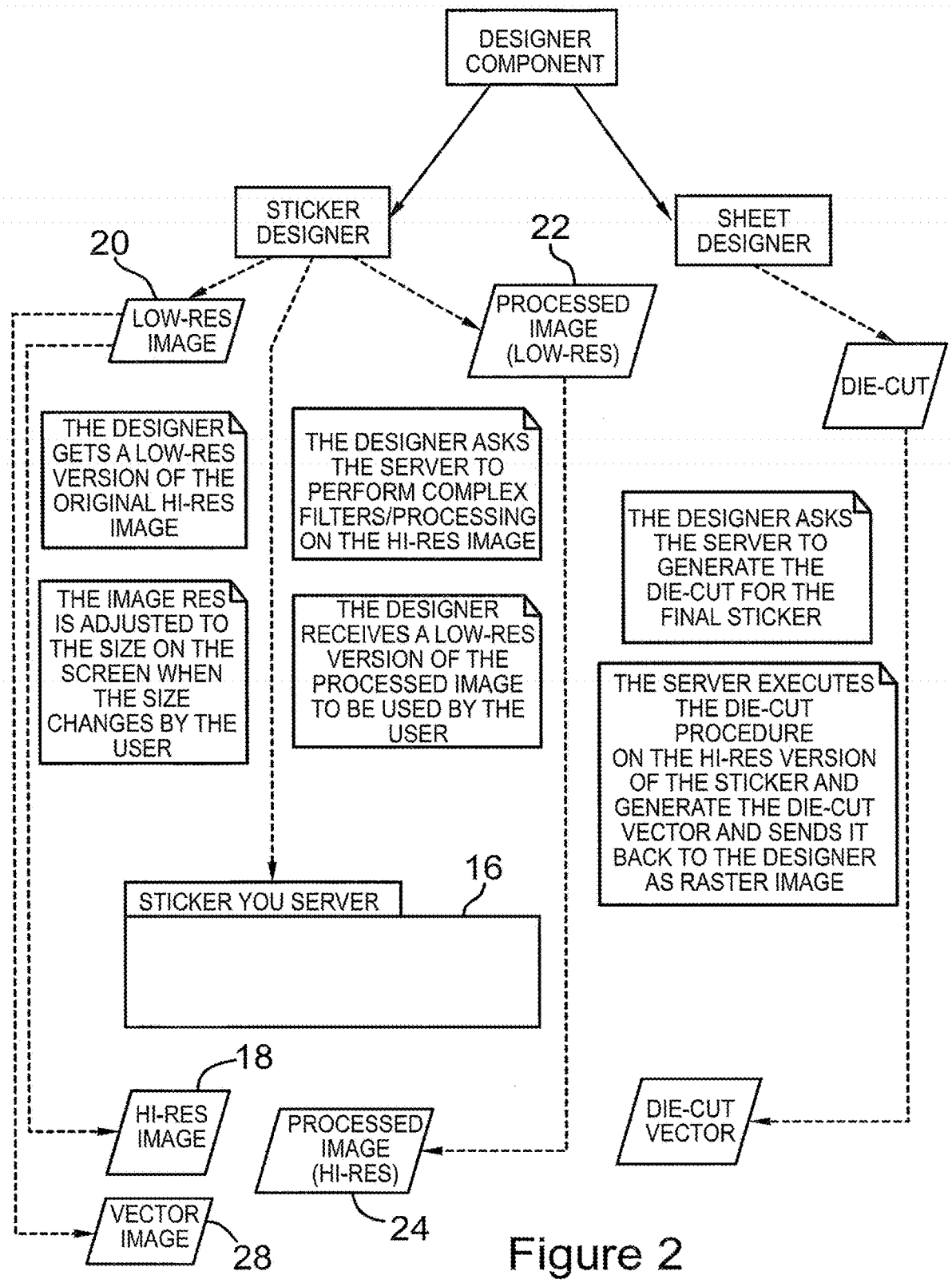
FIG. 2 describes how one embodiment of the method and system of the present disclosure is designed and implemented.

FIG. 2 illustrates how one embodiment of the method and system of the present disclosure is designed and implemented to provide the above features.

Technology Overview

In accordance with one embodiment of the present disclosure, the method and system provide a 3-tier system: a user interface (creation tool) ("Tier 1"); a server application ("Tier 2"); and a printer service application ("Tier 3").

The platform may be implemented using the following programs and technologies: Microsoft.net framework; Adobe Flex Builder 3; Adobe Flash CS4; Adobe Illustrator CS4; Adobe Photoshop CS4; Multiple open-source C# and C++ libraries, such as: AForge, GEOAPI, POTrace; and Multiple open-source ActionScript 3.0 code libraries, such as Adobe's Cairngorm specification. It will be understood that other similar programs and technologies, including different versions of the programs and technologies mentioned above, may be used to implement the methods and systems of the present disclosure.

Tier 1: End-User Interface (Also Referred to as the "Sticker Creator")

In one embodiment of the method and system of the present disclosure, the sticker creation section of the platform is a user interface that allows the user to import, link, create, and manipulate graphic images, objects and text. A user is able to drag assets (images, objects, etc., also referred to as "assets") onto a virtual stage (also referred to as a "canvas" and the words "stage" and "canvas" are used interchangeably in this specification) on the screen, and is able to change the size, color and positioning of the assets within the stage. The user may also add text to the assets and/or may add images and objects by drawing freehand on the stage. The programming processes detailed in the sticker creator section include: (a) Image uploads and imports; (b) Asset selection and accessing; (c) Detection of User Object Selection; (d) Image Transformation; (e) State management: saving and loading stickers; (f) Licensor enforced restrictions; (g) History States; (h) Image Masking; (i) Shape Creation; (j) Font Loading; (k) Alignment; and (l) Page layout.

Image Upload and Imports

The user interface (UI) includes tools that allow the user to import or upload any type and format of well-known images. The user can easily click on a button and locate an image file on his/her computer then upload that file. Once the upload process is complete, the user interface will trigger the second tier (server 16) to upload and import the uploaded file into its assets database. The second tier (server 16) will then process the file and create the necessary versions and die-cut of the asset (described in a later section). Once the asset is processed, it will be made available to the user interface to use within its stage and manipulated.

A similar pattern to this would be linking a file instead of uploading it. In this pattern, the second tier (server 16) will import a copy of the file from the source of the image and process it normally as an asset.

A well-known implementation of this pattern is the use of API and web services to import and create assets, and thus stickers, in real time.

Asset Selection and Accessing

From the user interface, the user can access and select multiple assets to include on the stage and can start to manipulate the selected assets. The tool allows the user to easily access any assets available on the platform through a series of calls to the second tier (server 16). All the assets accessible by the user are available in high resolution formats only 18 on the second tier (server 16). Once the user accesses an asset and adds it to the stage, the second tier (server 16) will send a variable low-res version of the image 20 (which is generated in run-time based on the user's user interface environment and needs). The user interface still links to the original asset by using a binary object representing the asset as an entity. The low-res image 22 manipulated by the user interface is a variable resolution image, that is, as the user manipulates the image using an asset transformation tool, the user interface will adjust the resolution of the image and acquire a new version 24 of the low-res image 20 from the second tier (server 16). This process allows the system to protect the high-res 18 original assets from piracy and copy, and protects the copyrights or trade-mark rights of the owner/licensor of the original asset.

The system may be configured such that the original asset and its high-res 18 version are inaccessible by any means of the user interface or external interfaces. Even if the user scales the asset to a large enough size, the second tier (server 16) will always send a low-res 20 version of the asset to the stage.

Detection of User Object Selection

Allowing easy access to the assets (images, objects, etc.) on the stage is paramount to creating a simple and fun environment in which to be creative. Native Flex technology allows for basic detection of mouse location and whether or not a mouse is 'over' a specific asset on the stage. However, when dealing with transparent and non-rectangular images or objects, this can get complicated and frustrating to the user, as it may appear that they are clicking on something when in fact their mouse click is being trapped by an image or object above it.

To address this difficulty, in some embodiments of the method and system of the present disclosure uses pixel level hit detection, capturing the x and y coordinates of the mouse click point and testing that against the visible pixels of each image or object on the stage until a match is found. In order to be as precise as possible, bitmap versions of the images or objects are generated and then the precise pixel region that the mouse is over is tested for the existence of pixel data. If no data is found, the hit test is re-done, using just the bounding box of the images or objects instead. If multiple matches are found, the match that has the highest depth (the image or object closest to the "front" of the stage) is returned.

Once an image or object has been selected and returned, a selection box is drawn around the image or object to allow the user to manipulate it. This is described further in the following section on image transformation. In order to manipulate the image or object, the user performs multiple repeated mouse clicks. This may cause the user to inadvertently select another image or object or perform another unintended action. To counter this possibility, once an image or object is selected by the user, all remaining images or objects on the stage are removed from eligibility for mouse detection, until another selection is made.

Image Transformation

The asset transformation tool takes advantage of common algorithms and paradigms that are used in most image editing tools. Some of that include the standard 2-d transformation matrix and other complicated trigonometry and calculations. In some embodiments of the method and system of the present disclosure, a pre-built set of classes to handle these calculations is used. In some embodiments of the present disclosure, however, more robust hit and selection detection algorithms are used to meet the needs of the method and system, as outlined above.

The user may be provided with an industry standard selection box and the ability to rotate, scale and move the selected image or object. This is done by altering the item's transformation matrix, and applying scaling and rotation to change the item's size and appearance.

This data may be recorded in order to re-apply the transformation when loading a saved state of the sticker from the second tier and the asset database. This is done by parsing out the matrix data and converting it to XML. Upon reload, the matrix is recreated and applied to the image or object.

State Management: Saving and Loading Stickers

The system follows an industry standard of using XML as the format of storing states of a sticker 10, a sheet 12 of stickers 10, layers within the stickers 10, and assets. The user interface serializes the state of the stage into a series of XML documents representing the state of the stage and the sticker 10. The user interface then sends the XML serialization to the second tier (server 16) to save the state of the sticker.

Upon loading a state of the sticker 10, the user interface acquires the XML serialization from the second tier (server 16) and then performs a reversing process which will de-serialize the XML into binary objects and renders them on the stage.

Licensor-Enforced Restrictions

The method and system of the present disclosure may restrict a user's freedom of movement on an asset level in order to allow for copyrighted assets to be used without distortion or manipulation of those copyrighted assets. This also allows the system to ensure that all assets on a page will be properly aligned and simplifies the error-checking as no copyrighted assets can be rotated or distorted in any way once they reach a user's page. This is achieved by having the user interface send a signal to the second tier (server 16) every time an asset has been added or removed from the stage. This call (signal) sends a serialized XML version of the stage elements and will receive the applied restrictions on the stage based on the elements. The second tier (server 16) will run through the rules of the licensors and compiles a list of the restrictions that should apply to the stage (if any).

History States

With many capabilities and effects built into the stage, the method and system of the present disclosure may provide the user with the ability to undo or redo any changes previously made by the user. This is accomplished by adding a trigger for transformation updates from the above transformation management classes. Once the transformation manager triggers an update after an action has been completed, the properties of all elements on the stage are updated by recording the results of their transformations and property changes.

One issue surrounding the ability to undo is that one cannot simply use references to the objects in the collection of history states, otherwise when that reference is updated, the history is also updated and changes are lost. In order to accommodate this, the underlying data of each image or object is altered to include a method that essentially duplicates the properties of these items and stores them in an accessible format. This format is maintained for every action the user performs for each sticker 10, but to optimize performance, the format is cleared once that sticker 10 has been closed. The undo/redo aspect then becomes a simple cataloguing of the various formats of the sticker 10 and re-loading the assets with their properties from that particular format, while keeping them in a chronological index.

Image Masking

In some embodiments of the present disclosure, the method and system provide the user with the ability to frame uploaded images and convert them to stickers 10 as this is expected to have mass appeal and to work very well in the existing system. With the selection system, the method and system of the present disclosure allows for several modifications to accommodate the creation of masked objects and for the framing of images.

In these aspects, a customizable object is provided to separate the mask layer from the rest of the image, thus providing a place to put and store the user-uploaded content without it appearing over top of the rest of the frame. Once this layering is established, the method and system refers to the actual placeholder for the mask and uses Flex's native masking effects to eliminate the non-masked areas of the masked image.

Once masked, the user is given the ability to control either the mask or the frame, and in some cases the mask becomes completely invisible (similar to a simple circle mask) and therefore the user has no pixels to grab. To configure this to work with the method and system of the present disclosure, the system checks and determines whether the mouse is over the masked object, and forces the selection to the mask first. A special icon that the user can click on to change the selection to the masked image itself may then be provided. The system also binds the masked image to the frame's selection, so that the user can move both the frame and the masked image concurrently.

The final aspect of masking the image comes in detecting the masked area to determine whether or not to remove the mask. This involves overlaying the alpha channels of the image and the mask and checking for pixels with modified color data. If there are no pixels this means that the two images do not overlap and the mask is removed.

Shape Creation

The method and system of the present disclosure may include a system where the initial drawing or shape is stored as a vector object 28 on the second tier (server 16) and the asset database, and both the second tier (server 16) and third tier, and the tool accurately reproduce the same shape given the same coordinates.

One source of difficulty is when a user manipulates a shape as though it were a regular object, through transformation. The method and system of the present disclosure may resolve this issue by taking the shape's matrix and applying it to the existing points, thus generating new coordinates, and then re-drawing the shape. These new coordinates are stored after every update and passes to the server 16. This means that the stored default shapes retain the same basic size, but a user can transform any shape and save it and it would remain transformed upon reloading.

Font Loading

The fonts used within the text application of the method and system of the present disclosure may be licensed for commercial distribution, but the loading and management of the fonts are required to optimize the performance of the method and system while still keeping the quality of using embedded fonts.

In some embodiments of the present disclosure, a solution to this issue is to use graphical previews to populate the list of fonts, thereby removing the requirement of having all fonts loaded in order to display a list of fonts in the typeface of the font they represent. This solution also involves embedding some of the Unicode characters of the font within separately compiled SWF files and loading them in as runtime assets when required.

Alignment

The method and system of the present disclosure may allow may then be provided users to properly align objects on the stage in relation to other objects. While size would be important when dealing with fixed-width templates, most of the stickers 10 and sticker elements can be re-sized at the will of the user, and as such the system aligns elements to each other rather than pre-set positions on the stage.

This alignment of elements is determined by object location, and activates when a user is actively "moving" a selected object with the mouse. The alignment analyzes both the x and y planes, comparing each object's left and right edges, as well as the object's midpoint, against the dragged object's left and right edges and midpoint. If the coordinates are within a certain threshold, the object is "snapped" to that position as a suggestion of location and a line is drawn, indicating to the user the intended finish position and alignment.

Once a snapping suggestion has been made, the system overrides the typical mouse movement to keep the item at the suggested position until a larger distance threshold has been reached, an indication that the user does not intend to use the suggested position. This process is also repeated on the y plane using each object's top and bottom edges and its horizontal midpoint.

Page Layout

In some embodiments of the method and system of the present disclosure, page preview mode is where the user can re-size and organize their stickers 10 onto a page that corresponds to the sheet 12 for purchasing. Much of the same functionality of create sticker mode is also included here, but with further restrictions. Thus, this area allows the user to organize their page before printing. The programming processes detailed in this section include Sticker Navigation.

The source of the navigation layout comes from the page preview. Once a page is loaded, a copy of each sticker 10, including preview image, size and location, are dispatched to update the navigator. The navigator uses this information to generate a smaller version of the page with clickable links that launch the specified sticker into sticker creation mode. This data is updated with every change made to the page.

The navigator also highlights the sticker that is currently being edited and removes said highlight when that sticker is closed or the user returns to page view. This is done by updating a tracking variable and imposing an orange selection rectangle around the preview image.

Tier 2: The Server 16 Application

The server 16 application contains most of the image manipulation sequences, servicing the user interface, servicing the external API, servicing and importing and linking to external sources and the management of the asset database.

The programming processes detailed in the server application section include: (a) Asset management; (b) Rules and restrictions management; (c) Asset anatomy (Layering) and reconstruction process; (d) The generation of the die-cut; (e) Die-cut as a template; (f) Asset protection; (g) Sticker state management; (h) External interface service; and (i) Checkout and ordering process.

Asset Management

Figure 3:
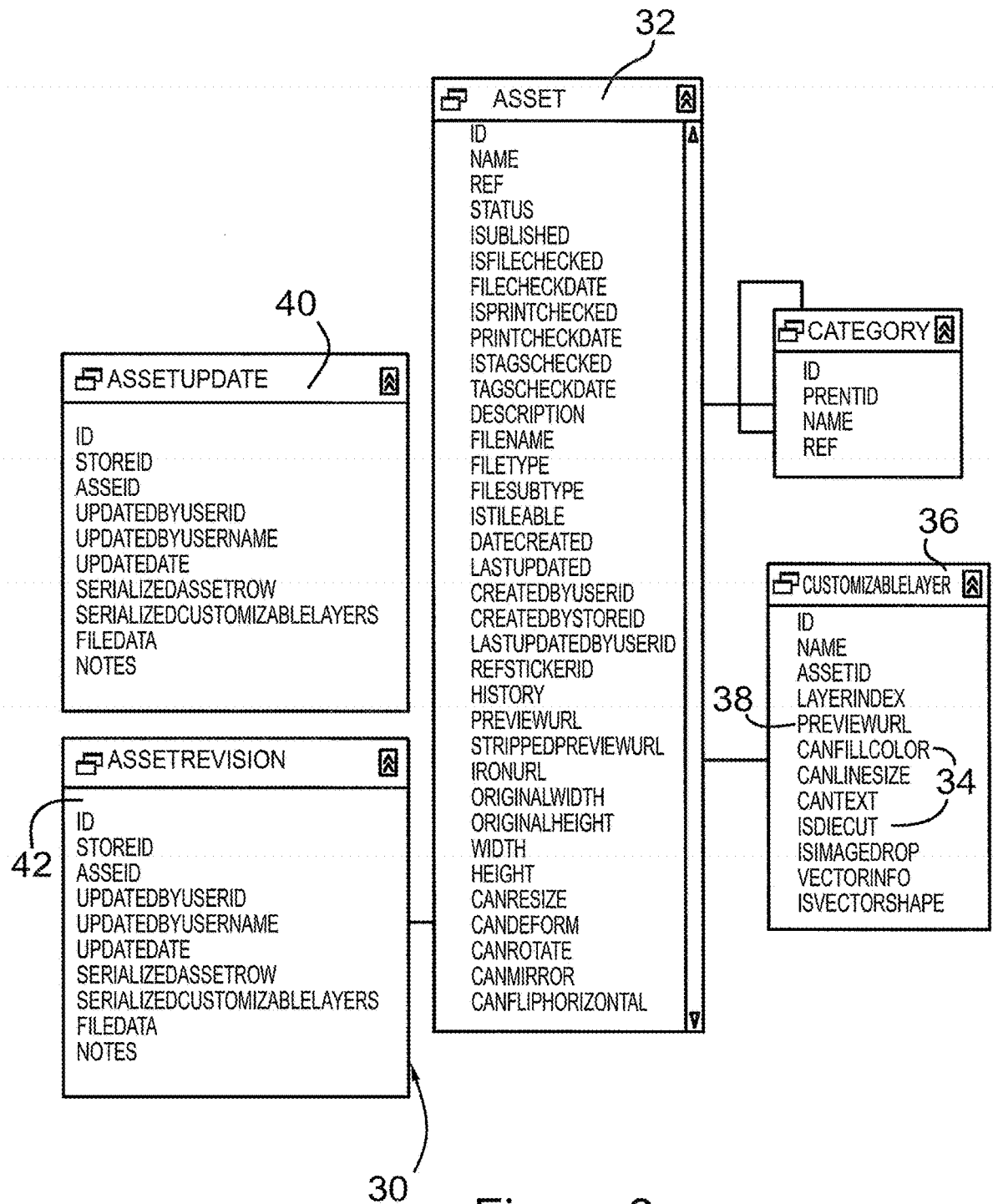
FIG. 3 depicts the database structure of one embodiment method and system of the present disclosure.

All assets are stored in a centralized database containing the meta-data of the asset. The method and system of the present disclosure may use the database structure as depicted in FIG. 3.

There is a unique record 30 stored in the database that represents an asset. The asset can be uploaded or imported into the database. Once an asset exists, the asset row 32 contains information about the asset, its owner, its type and any explicit restrictions on it. The system will then produce automatic records based on the asset structure and its anatomy. This process involves analyzing the original file of the asset and produce meta information about the asset. The process is described in detail in a later section. Once the asset is processed, a set or rows 34 in the table ("CustomizableLayer") 36 are produced accordingly. Those rows are derivative records that dictate the behaviour of the asset in terms of customization.

The process then generates multiple transparent high resolution images for the following: (a) Asset as a whole: this image will be generated to represent the asset as a whole. The resolution that is taken of the asset is the smaller of either the maximum size of the rasterized asset or the maximum printing area multiplied by the maximum printing DPI (for example: 8.5"×11" sheet on 150 DPI=1275×1650). The above formula will give the stored size of the asset which will be referred to hereinafter as the asset size; (b) A snapshot of every customizable layer 36 of the asset at the asset size resolution.

Once all the images are produced, they will be stored and will be given a URL which will be stored in the field "PreviewUrl" 38 of the asset and each customizable layer 34. This process is important later on in the process of reconstruction of the asset inside of a sticker.

All asset revisions and asset history are stored as serialized XML format in the 2 tables: AssetUpdate 40 and AssetRevision 42. This allows the platform to revert back to any revision with full information in sync. The process of updating assets is done in a two-phase commit fashion: commit the changes to AssetUpdate 40 and then commit AssetUpdate 40 to Asset 32. This paradigm allows the platform to perform concurrent updates on the same asset from multiple users.

Rules and Restrictions Management

All assets carry on their restrictions and rules as one or more of the following: (a) Explicit restrictions stored within the asset metadata. This includes restrictions such as: resizing, rotation, flipping, and deformation. (b) Inherit restrictions. These restrictions are stored within the container folder (album or library) which propagate to the assets. These restrictions include: ability to mix with other library assets, ability to mix with text objects, and ability to mix with other types of objects.

Asset Anatomy and Reconstruction Process

The system provides two ways of importing assets: (a) a layered asset (vector or raster layers), and (b) a single layer raster image.

Layered Asset

Figure 4:
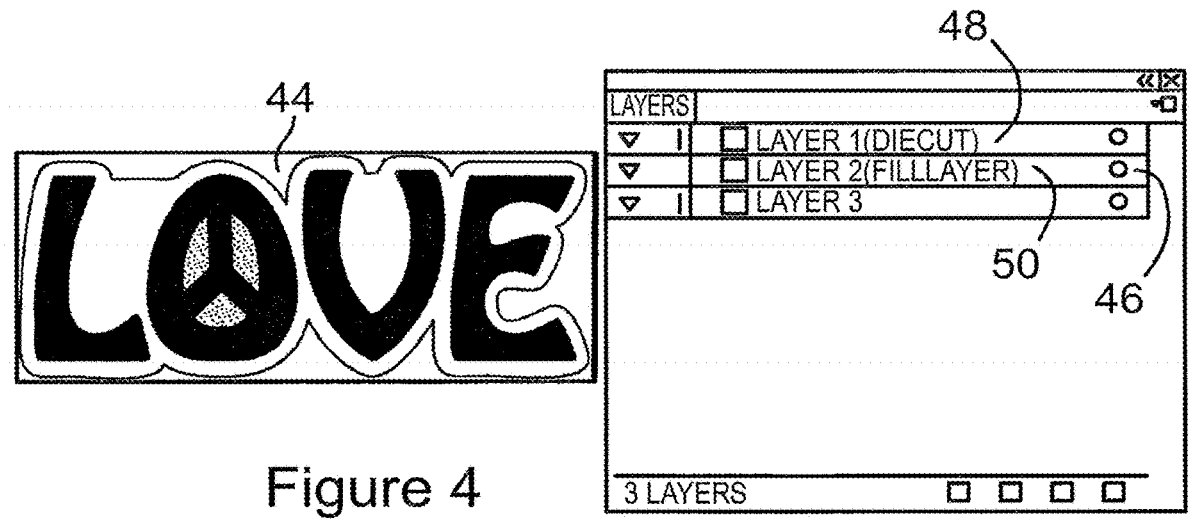
FIG. 4 shows an example of a multi-layer asset that consists of 3 layers.

The system provides a simple way for designers and artists to communicate and control the behaviour of the layers to the system via a simple naming convention embedded within the layer name referred hereinafter as "Directives". FIG. 4 shows a sample asset 44 with directives 46 embedded within it.

FIG. 4 shows an example of a multi-layer asset 44 that consists of 3 layers. The directives 46 are embedded within the names of the layers with rounded brackets. In the above examples, it uses the following directives: (Diecut) 48 and (FillLayer) 50. The following are some of the directives 46 that the system can support: (a) Diecut 48: defines a layer that contains the vector representation of the proposed die-cut of the asset; (b) FillLayer 50: defines a layer to become colorized by external dictation; (c) LineColor: defines a layer to become colorized by external dictation and represents an outline; (d) LineSize: defines a layer that can change its line thickness by external dictation; (e) DynamicText: defines a text/vector layer that contains changeable text dictated externally; (f) ImageDrop: defines a layer that can be used to mask another asset or part of asset into it; (g) FillPattern: defines a layer that can be filled with a pattern represented by an asset or part of an asset.

Figure 5A:
FIGS. 5a and 5b show the customizable Layers produced from the example of FIG. 3.
Figure 5B:
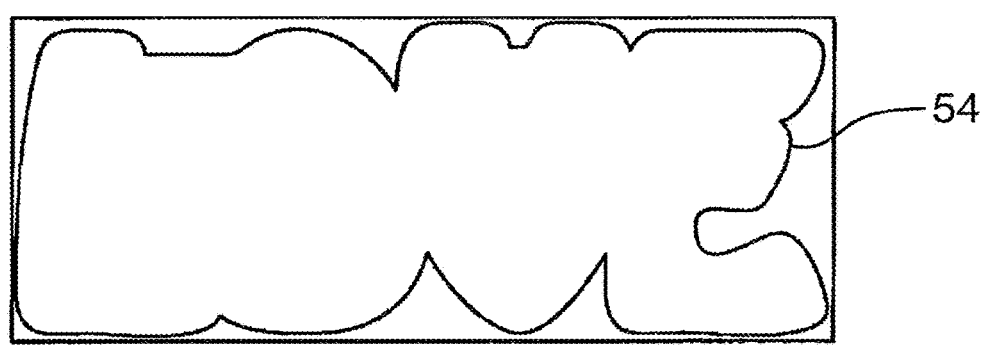

The system will then create a set of customizableLayers representing the different layers in the asset. If the asset does not have any layers with directives, the system will not create customizableLayers. In this setup, a layer can have multiple directives on it which will enable it to polymorph based on the directives. FIGS. 5a and 5b show the customizable Layers produced from the example of FIG. 4.

Single Layer Raster Image

Figure 6:
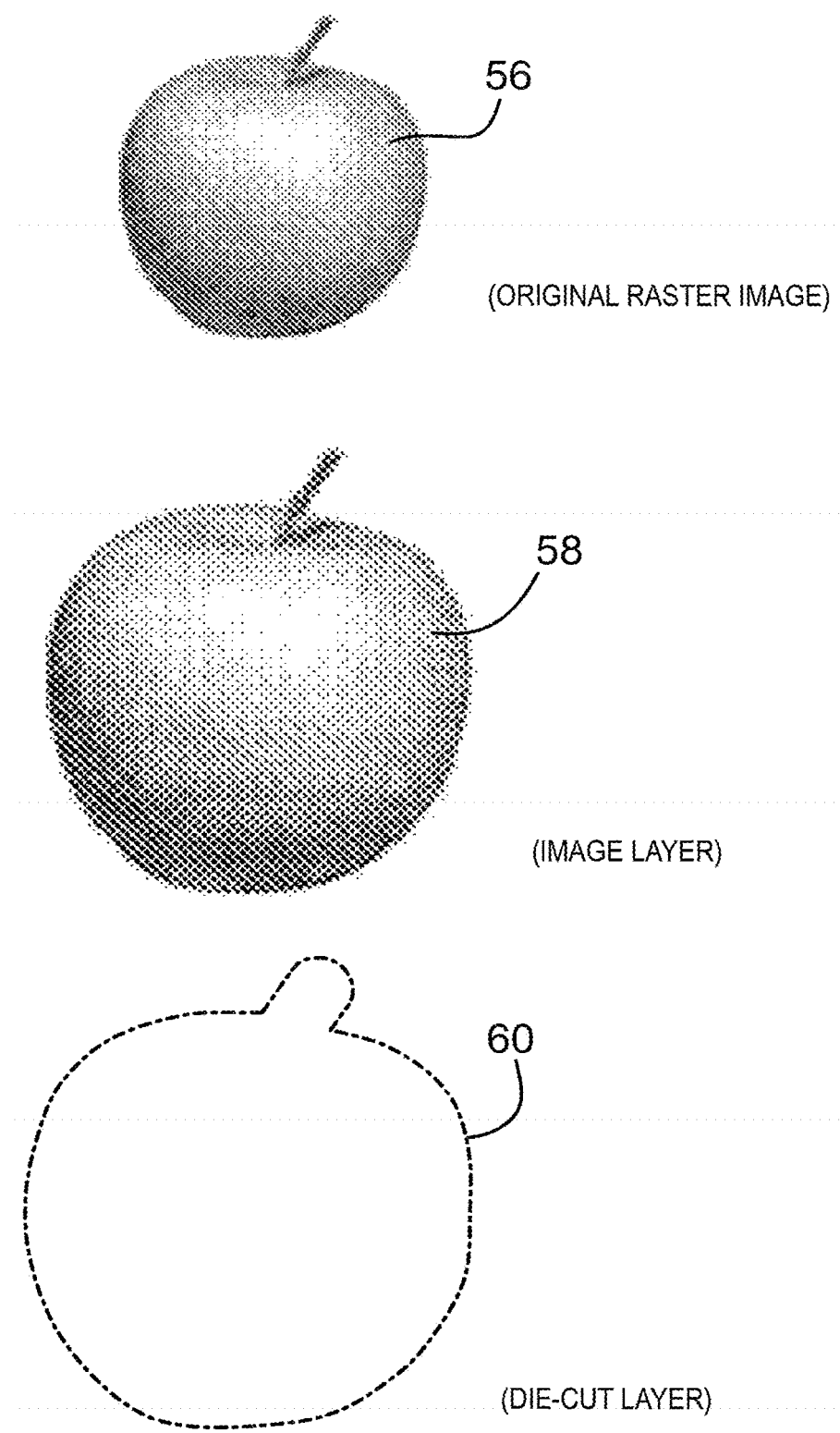
FIG. 6 illustrates an example of a raster image asset imported into the system.

FIG. 6 is an example of a raster image asset 56 imported into the system. In single layered raster image files 56, the system will create an additional customizableLayer 58 that contains the die-cut 60 data. The die-cut 60 data can be a simple rectangular shape that surrounds the image 56 or can be a detected die-cut which is described in a later section.

Generation and Detection of Die-Cut

The die-cut detection in the platform can occur in two ways: (a) raster asset die-cut detection, and (b) vector asset die-cut detection.

Each way is used in the platform corresponding to the type of asset it applies to. Both ways then merge into one single path to create the final die-cut.

Raster Asset Die-Cut Detection

Figure 7:
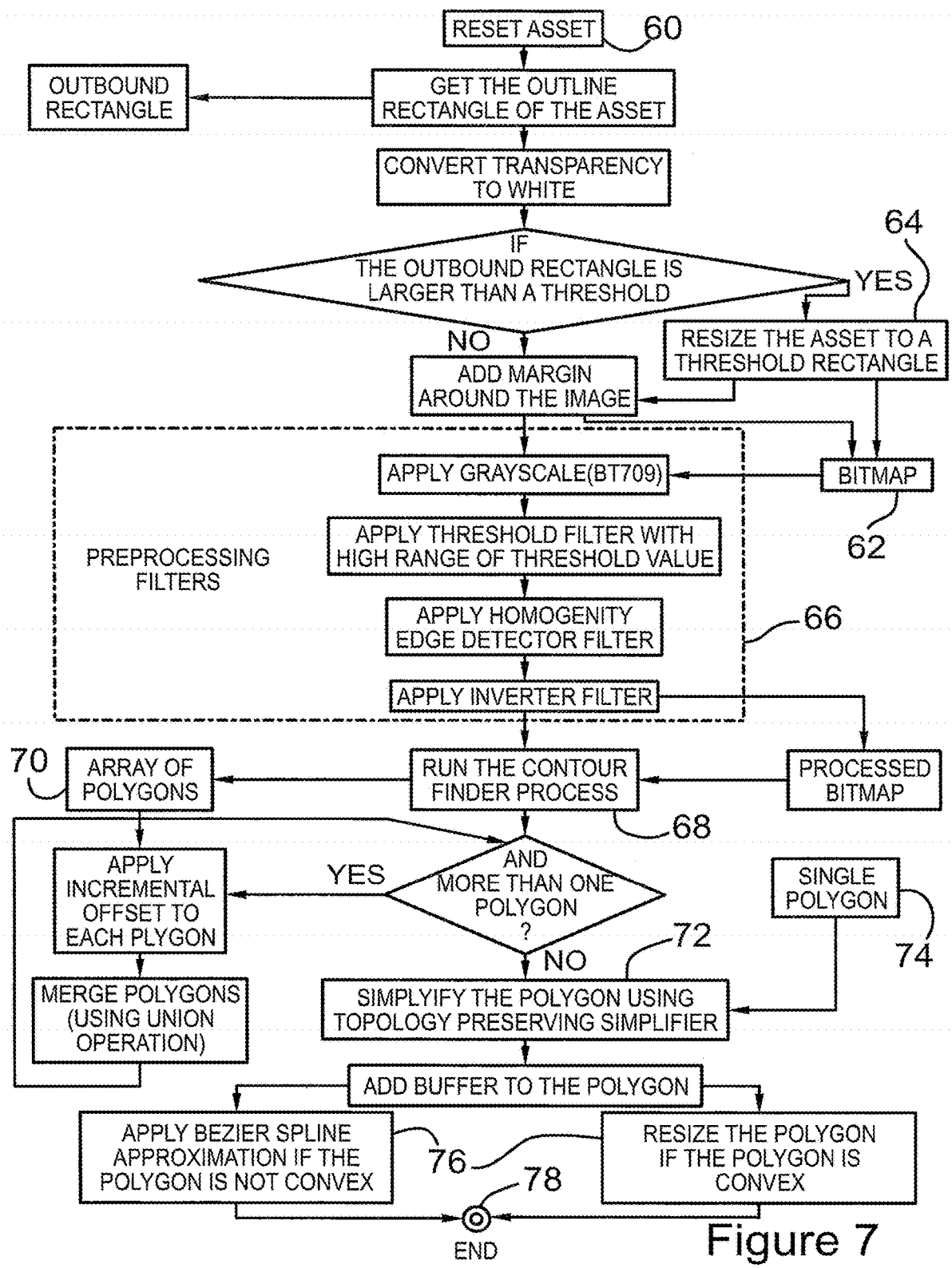
FIG. 7 illustrates the Raster asset die-cut detection system of one embodiment of the method and system of the present disclosure.

In raster assets, the asset is uploaded to the art bank without any information about what the die-cut would look like. The simplest way to create a die-cut from a raster image is to create a rectangle around the image. The system in this platform searches into the raster data of the image to detect the outer outline of the image by going through a series of processes. FIG. 7 outlines the sequence and the processes that the system goes through in order to do this. The process undergoes a series of processes as follow: (a) Convert the image file 60 to a raster bitmap format 62; (b) Resize 64 the bitmap 62 down to speed up the processing; (c) Apply a series of filters 66 on the bitmap to reduce noise and colors; (d) Use a pixel edge detection algorithm 68 on the bitmap to generate a set of polygons 70 corresponding to all closed shapes in the bitmap; (e) Simplify each polygon in the set generated using a polygon simplification algorithm 72; (f) Detect holes and eliminate them from the set; (g) Detect nominal polygons and eliminate them from the set; (h) Ensure that there is only one polygon 74 left in the set; (i) Apply a polygon smoothing algorithm 76 (POTrace is used in the platform) and convert to a geometric shape containing sets of Bezier curves; and (j) Finalize the shape 78.

Vector Asset Die-Cut Detection

In some embodiments, the method and system of the present disclosure generates vector assets' die-cuts using the following process: (a) Each asset stored in the art bank is stored with metadata describing what each layer is;
(b) Each asset is stored with the vector representation of the proposed die cut for the asset on its own; and
(c) The die cut vector data is stored as a single path or collection of paths (which are Bezier curves series).

When the sticker 10 is created on the user interface, it consists of a collection of assets. Each asset must have its own proposed die cut vector information. That is, if an object is part of the art bank, it will contain the vector information as above. If the object is a raster asset, it will go through the die-cut detection described in the previous section. If the asset does not have any vector information for the die-cut, the method and system will assume rectangle die-cut.

Figure 8:
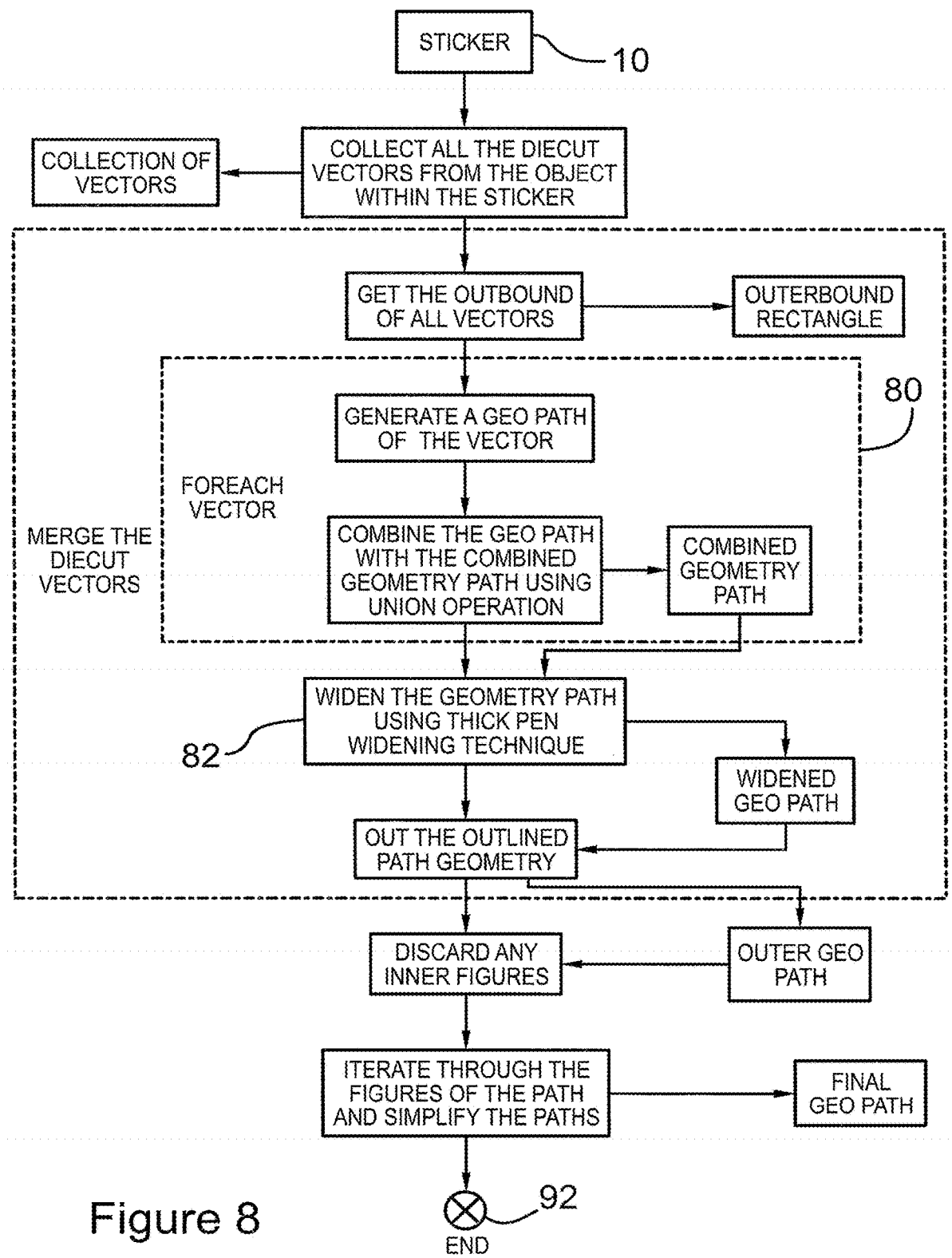
FIG. 8 illustrates the process of combining and detecting the die-cut of a collection of assets in one sticker of one embodiment of the method and system of the present disclosure.
Figure 9:
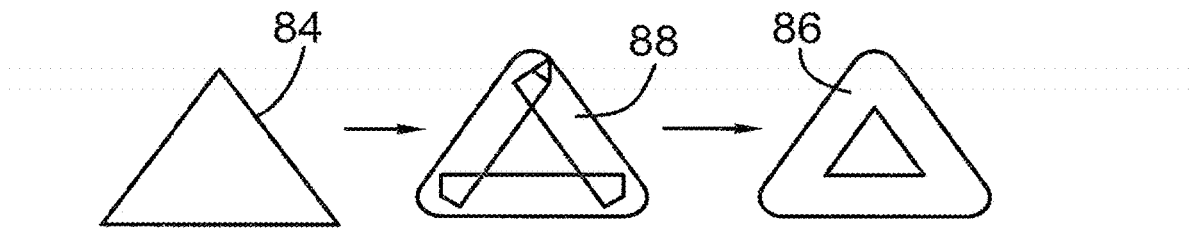
FIG. 9 shows the widening algorithm using a variable pen-wide shape drawing algorithm.
Figure 10:
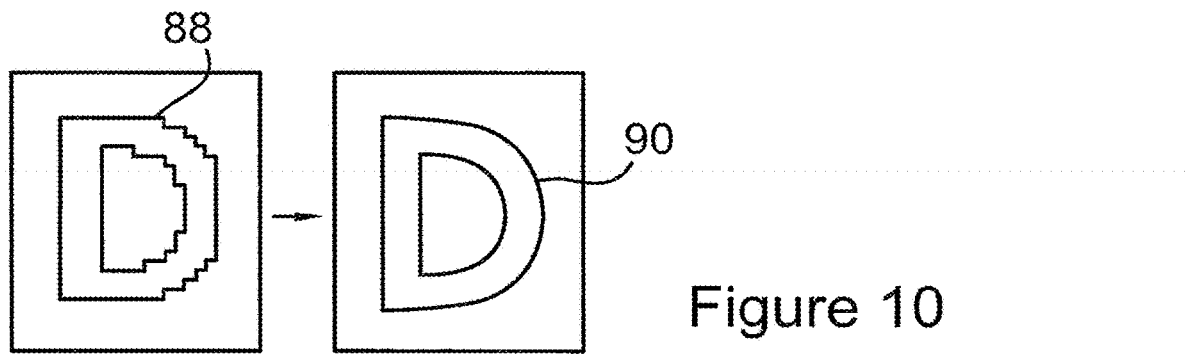
FIG. 10 is an example of applying a polygon smoothing algorithm.

The process of combining and detecting the die-cut 14 of a collection of vector graphic assets in one sticker 10 is shown in FIG. 8 which follows the following series of steps: Obtain a geometry vector (path) for all die-cut shapes in the sticker 10. Combine the geometry vectors (paths) of all die-cut shapes to form a combined (die-cut) geometry vector (path) by applying a union operation 80 on all the die-cut shapes, for example, using geo API methods. Widen 82 the combined (die-cut) geometry vector (path) with the offset argument to apply an offset to the combined (die-cut) geometry vector (path). An example of a widening algorithm is illustrated in FIG. 9. In the widening algorithm of FIG. 9, a variable pen-wide shape 84 drawing algorithm is used to draw the shape using the corresponding width 86 determined by the offset 88. Any internal shapes defined by the combined (die-cut) geometry vector are detected and eliminated by examining each shape against the set of all shapes (die-cuts) and sticker requirements. The combined (die-cut) geometry vector is simplified by applying a simplification algorithm if the combined geometry vector is too complex. Finalize the shape 92.

Die-Cut as a Template

It is possible in the system to use any die-cut object either a free-form die-cut or an asset-related die-cut with any assets as the template for the sticker being produced. This allows for a templated approach where the user is provided with a set of templates of die-cut to choose from and which will become the background template for the sticker that contains the die-cut layer.

Figure 11:
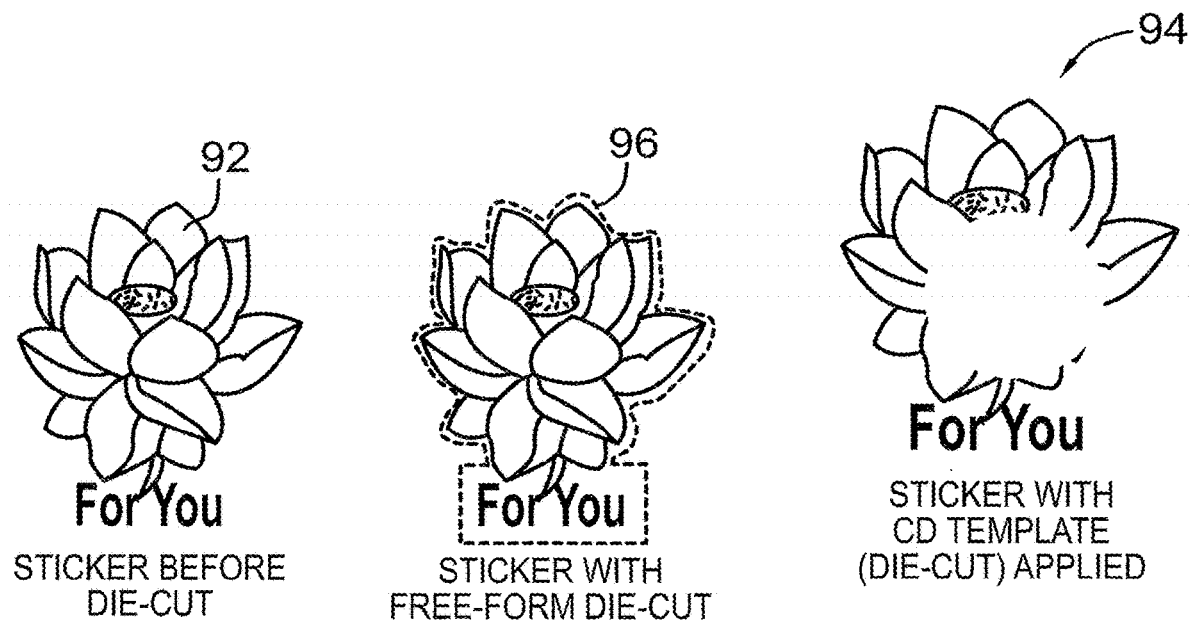
FIG. 11 illustrates an example of a sticker morphed into any shape or template.

An example of this approach is illustrated in FIG. 11. This approach can be done in two fashions: (a) Early-bound templated stickers: The sticker 92 is created with the die-cut template 94 (layer) as the first layer of the sticker 92. The sticker 92 is then bound by the template and all the assets thrown into the sticker 92 will be bound by the die-cut layer 94; (b) Late-bound stickers: the sticker 92 when created is not bound to any die-cut template 94 and will follow free form 96. At the end of the process of creation (or during the process of creation), a die-cut template 94 is assigned to the sticker 92 and at this point the sticker 92 becomes bound to the die-cut 96 and any free-form die-cuts will not take any effect.

This approach allows the sticker 92 to morph into any shape or template and not only follow its free form shape.

Asset Protection

All assets high resolution images are stored in binary format on the server. All external access to the assets are done through a proxy called "Resource Manager". The resource manager will always return a lower resolution images to the external caller (including tier 1). The lowering of the resolution is done in 2 ways: (a) Low-resolution pixels per image: the resource manager will never exceed a threshold of accessing pixels per image. For example if the threshold is 50%, any asset accessed with a size of more than 50% of the asset size will be considered a high resolution and will not be allowed. As such the second method will be used to return a low-res image; (b) Low-resolution bytes per pixel: used mainly when the caller is accessing a higher than the threshold pixels per image for the asset. In this case the returned asset contains the required pixels per image but with lowered bytes per pixel.

For example, if the high-res threshold is 50% and the asset size is: 1275×1650, an external caller can get a version of the asset up to 637×825 with the same amount of bytes per pixels (generally 3 bytes/pixel). If the caller is asking for a higher resolution (say 1000×1000), the resource manager will return an image of 1000×1000 of size but with 8 or 16 bits per pixel.

This technique will protect the original asset from being exposed to any external interface and thus provides full protection to the asset from any piracy.

Sticker State Management

Figure 12:
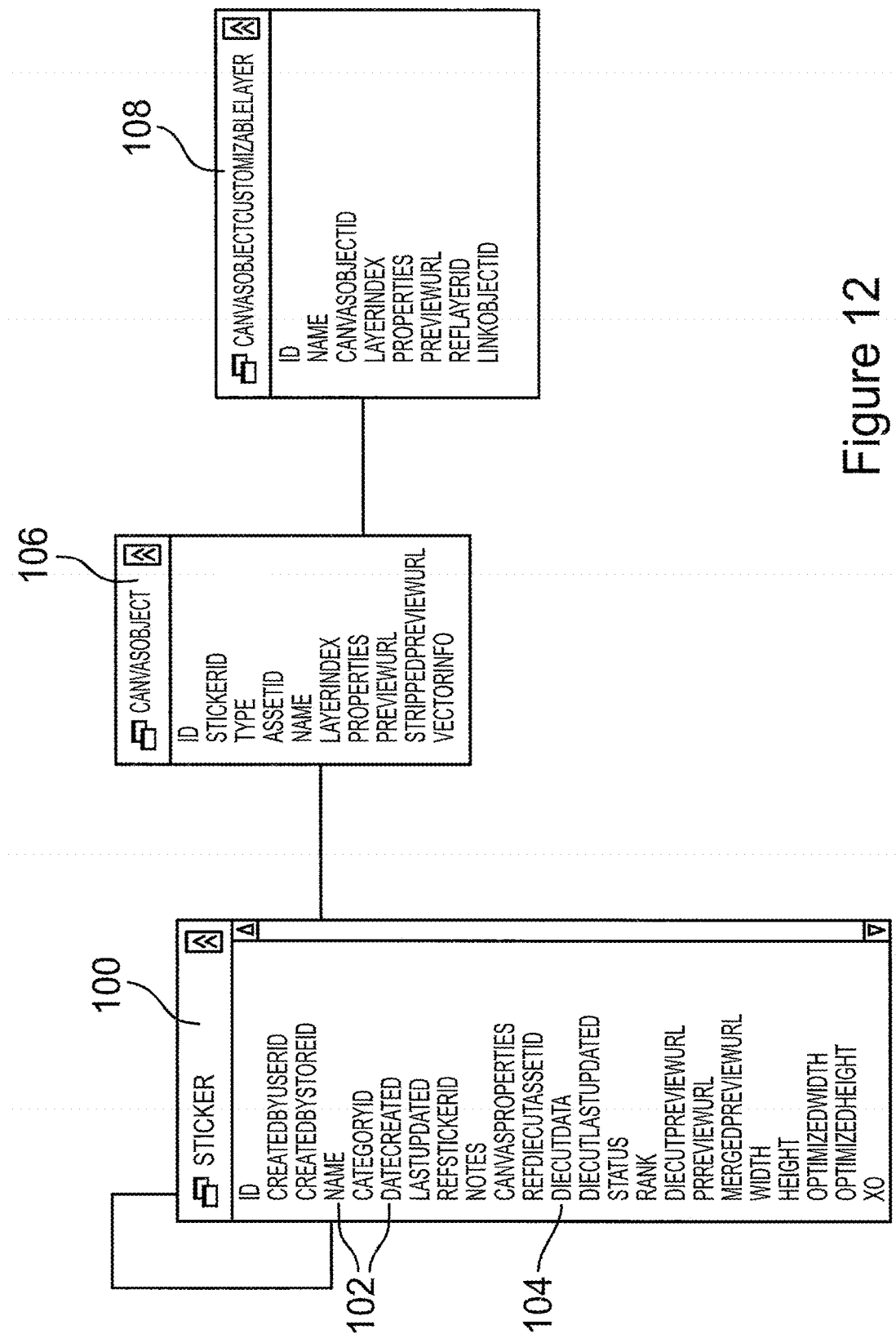
FIG. 12 illustrates a database schema of how the sticker is stored.

All stickers are stored as XML data which contains the metadata describing the sticker and its composition of assets and customizable layers. FIG. 12 illustrates a database schema of how the sticker is stored. The sticker metadata is stored as a unique record (Sticker) 100 which contains a description 102 of the sticker, its direct properties (width, height, x, y, owner, etc.) and also contains the final die-cut 104 of the sticker. Every asset part of the sticker layers is stored in (CanvasObject) 106 which refers to the asset used for this layer. Any non-asset layer is also stored as a (CanvasObject) 106 but without referring to an asset. Any customizable layer part of an asset which is part of a layer of the sticker is copied over to (CanvasObjectCustomizableLayer) 108 and which contain the customization parameters within it.

External Interface Service

This component of the system is responsible for serving Tier 1 (user interface) or any external interface. It is the gateway to all the functionality and interfaces of the system's Tier 2 (server 16).

Checkout and Ordering Process

In the some embodiments of the method and system of the present disclosure, the Checkout Process consists of the following steps: Preview Order; Registration; Shipping Address; Payment; Order Confirmation; and Search.

Preview Order

Previewing an order is the first step of the checkout process of the method and system of the present disclosure. The programming processes in this section include the following: (a) Remove Page: This function enables a user to remove a selected page from the current shopping cart; (b) Edit Page: This function is used to redirect the user to the Sticker Designer Tool. When a user selects a page, an event is triggered sending the value of the primary key for the selected page. This value is sent as a parameter to the designer tool indicating that the user would like to modify this page; (c) Add More Pages: This function is used to redirect the user to a search page in which sticker pages are populated from a database; (d) Detect Overlap: This function is used to detect overlaps between stickers on a page of the order. The first step in this process is to detect the stickers on the page and for each sticker, the system detects the die-cut points (these are kept in an array of points). The next step is to combine the geometries of the stickers by taking their intersections. If the result returns a new area, this means that there is an overlap between stickers on the page and a warning message will be displayed on the screen. Otherwise, there is no overlap and the user can continue the checkout process; (e) Fix Overlap: This function is used to fix any detected overlap on the page. It creates a new series of pages and fills them with the existing stickers.

Registration

After a page is created, the user can start the checkout process. If the user is already logged in, the user will be redirected to the Shipping Address page; otherwise the user will be redirected to the Sign-In or Registration page.

If the user has an account, the user can sign in and continue the checkout process. However, if the user is a new user and does not have an account, a popup will appear asking the user to enter the user's first name, last name and email address to register an account. After registering, the user will receive an email providing the user with a username and password for the next visit to the site.

After creating an account, the user is redirected to the next step of the checkout process, which is the Shipping Address page.

Shipping Address

In this step of checkout, the user is able to create a new shipping address or select an address from the addresses saved in the user's account.

Payment

In this stage, the user can select the following options: (a) Shipping Method: Examples of options for shipping include: Standard and Express. Depending on where the order is being shipped to, for example Canada or the USA, the estimated shipping date and price will be different. (b) Payment Method: Examples of payment options include Visa, MasterCard and AMEX as the credit card being accepted. (c) Billing Address: The Billing address can be different or the same as shipping address. The Tax value can be different based on the country and Province/State of the billing address. In addition, the tax calculation may be different depending on the country and/or province/State of the billing address. (d) Payment Services: Examples for payment Service: PayPal Direct Payment and eSelect Plus. Each of these payment services have a class that includes the following methods: (i) Purchase—The main aspect of this function is to get all the required information such as user shipping and billing information, credit card and Payment details information and which is back to the selected service. After the system sends the information, the related service will return a response which contains the error list and the transaction number; (ii) Refund Transaction—This function will get the Transaction number to be sent to the related service in which the transaction status will be changed to "refund"; (iii) Check For Errors—This function will get the response and if there is an error, it will return the error message(s).

Order Confirmation

Figure 13:
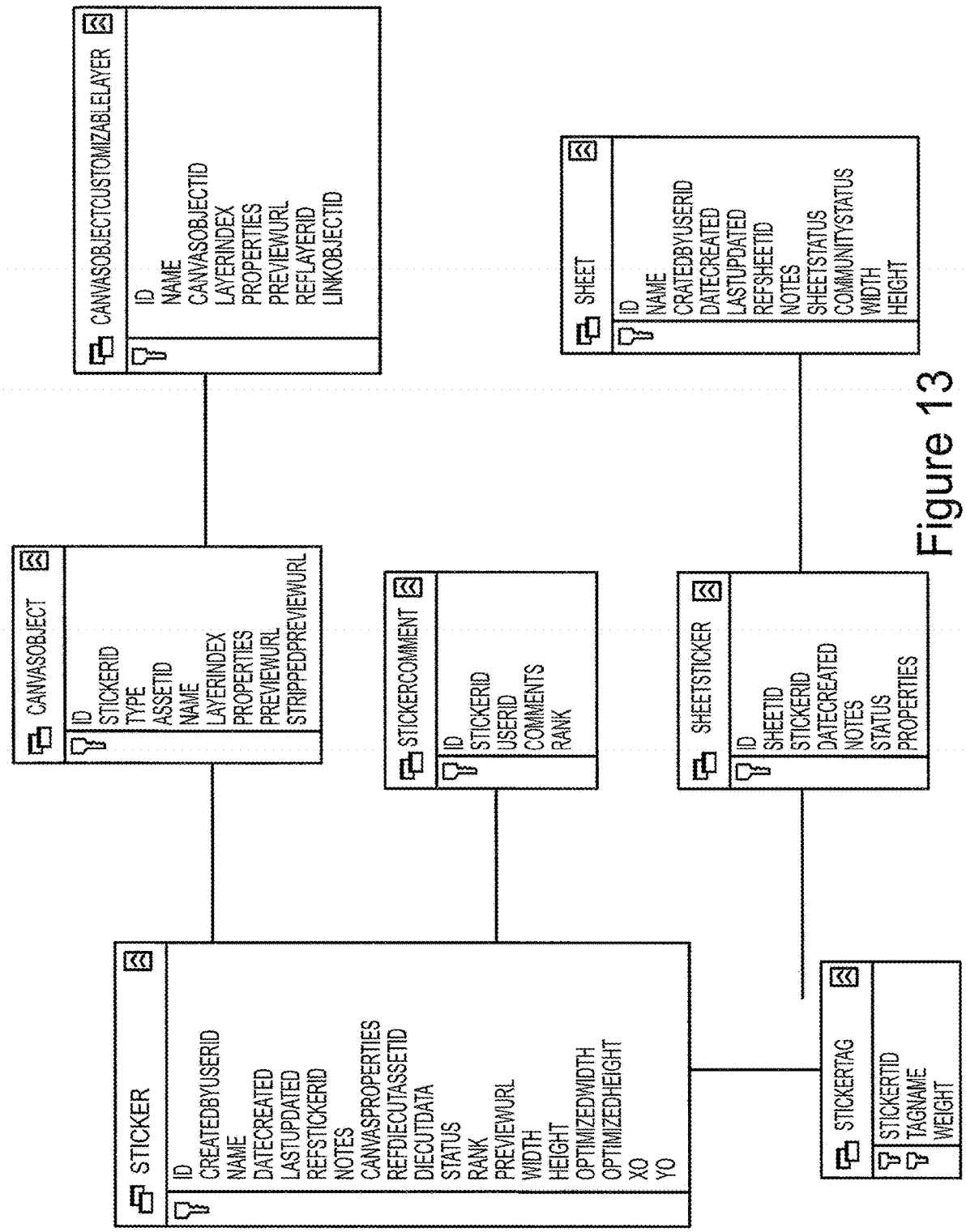
FIG. 13 is a diagram illustrating the metadata describing the sheet information used in Order Confirmation of one embodiment of the method and system of the present disclosure.

Placing orders: In this process, the system (server 16) will have a metadata describing what the sheet contains and what other processes were incurred on each sticker. The metadata describing the sheet information is shown in FIG. 13.

The process is to serialize the order data into xml form that can be stored as a string data. After the order is placed successfully, an order confirmation is sent to the user, which includes the details of the order.

Search

Search is a quick way to find stickers and add or remove them from the current order. Users can search for stickers in three different ways: Themes, Tags and Brands. Themes are collections of images under a specific name such as Signs, Fashion, and Travel. Tags are lists of tag name specified for stickers at upload. Brands are lists of all existing brands stored in the system.

A user is able to add or remove the selected sticker to or from the current page of the order by clicking on "add to page" or "delete from page".

By clicking on the sticker, a popup will appear which has the following functionality: (a) Add to page: This function adds the sticker to the current page; (b) Add to album: This functional enables the user to add the selected sticker to their selected album; (c) Email to a friend: This function is used to send the selected sticker to the friend; (d) Add to collection: This function will add the selected sticker to the user's collection album; (e) Rank: This function is used to give a rank to the selected sticker.

Tier 3: The Printer Service Application

This application is responsible for the production of the final product. Its primary purpose is to produce a high-quality sticker with the generated die-cut for each sticker within each sheet which is part of an order. The second purpose of this application is production cost effectiveness, speed, and quality control and assurance.

Accessing Assets and Sticker Data

This application will access all the high resolution assets directly in its raw binary format. Since this application is not exposed to any external use, it is safe for the application to access the high-res protected assets directly and without the proxy "Resource Manager". This paradigm ensures the highest quality in producing the final stickers on the printer.

Batch Orders into Workload/Workload Production

Figure 14:
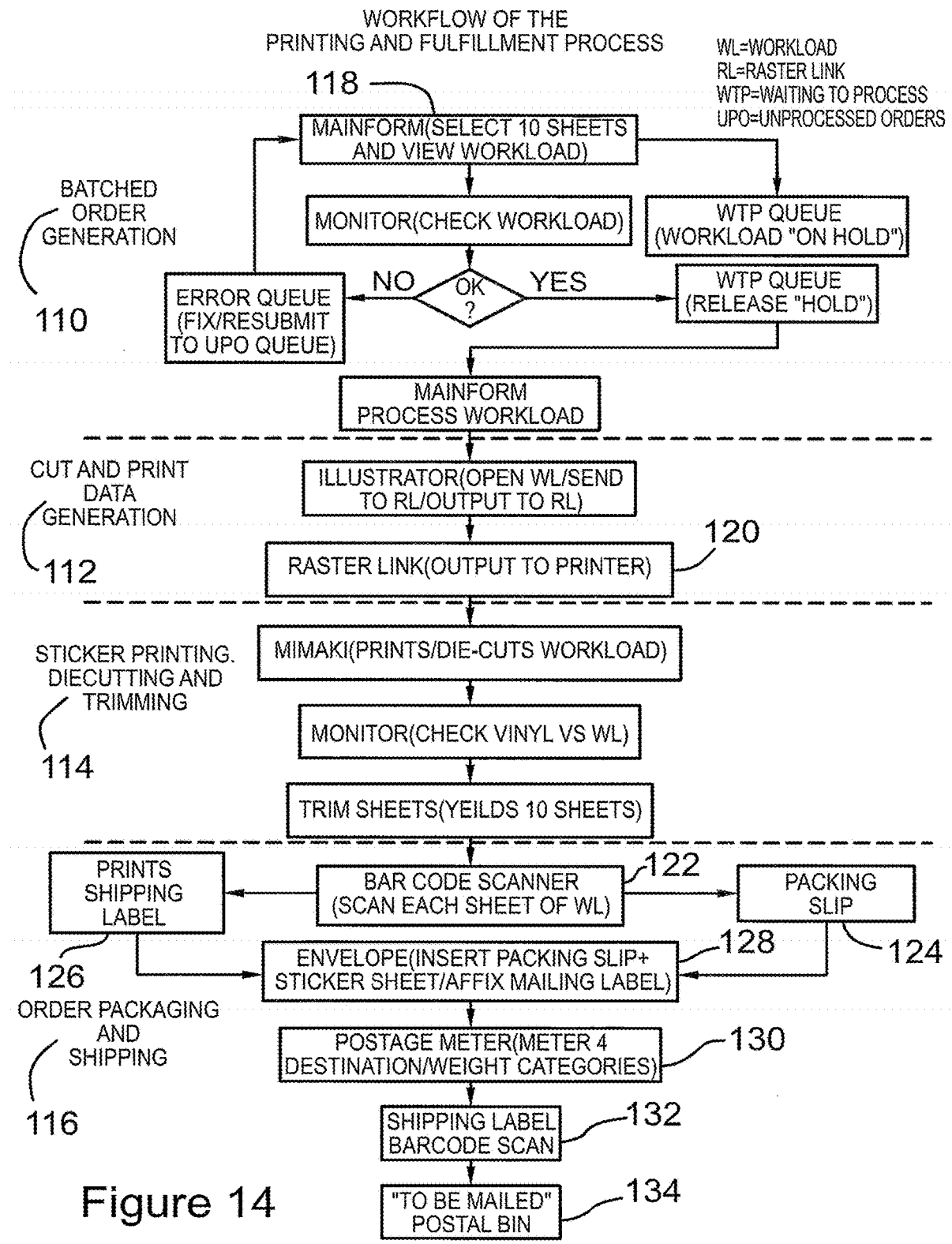
FIG. 14 illustrates the workflow of the four stages of the Printing and Fulfillment process of one embodiment of the method and system of the present disclosure.

FIG. 14 illustrates the workflow of the Printing and Fulfillment process. During the Printing and Fulfillment phase of the method and system of the present disclosure, sticker-sheet orders are grouped into "batches" of 10 sheets. They are then "RIPped," printed, die-cut, trimmed, barcode scanned, inserted into envelopes, addressed and metered for postage. This process can be divided into four main stages: (a) "Batched" Order Generation 110; (b) "Cut" and "Print" Data Generation 112; (c) Material Printing, Die-cutting and Trimming 114; and (d) Order Packaging and Shipping 116.

Example equipment utilized in each of these stages is listed below: (a) Batched Order Generation 110: Proprietary printer controller application; Wide-screen monitor; and Workload template file (Illustrator .ai file); (b) Cut and Print Data Generation 112: Adobe Illustrator application with "Fine Cut" plug-in; and "Raster Link" application; (c) Material Printing, Die-cutting and Trimming 114: Mimaki Engineering large format printer/plotter; Parallel Straight-edge; and T-Square; (d) Order Packaging and Shipping 116: Barcode scanner; Laser printer; Label printer; and Postage meter.

The Printing and Fulfillment workflow commences when the operator launches the Mainform application 118, a user interface consisting of five queues.

In some embodiments of the method and system of the present disclosure, function buttons are provided under two of the queues, allowing the operator to initiate viewing, batching and processing of the orders. The other three queues simply display the status of the batch as it moves through the various stages of production. The queues are named: Unprocessed Orders, Waiting to Process, Currently Processing, Processed and Packaged.

Figure 15:
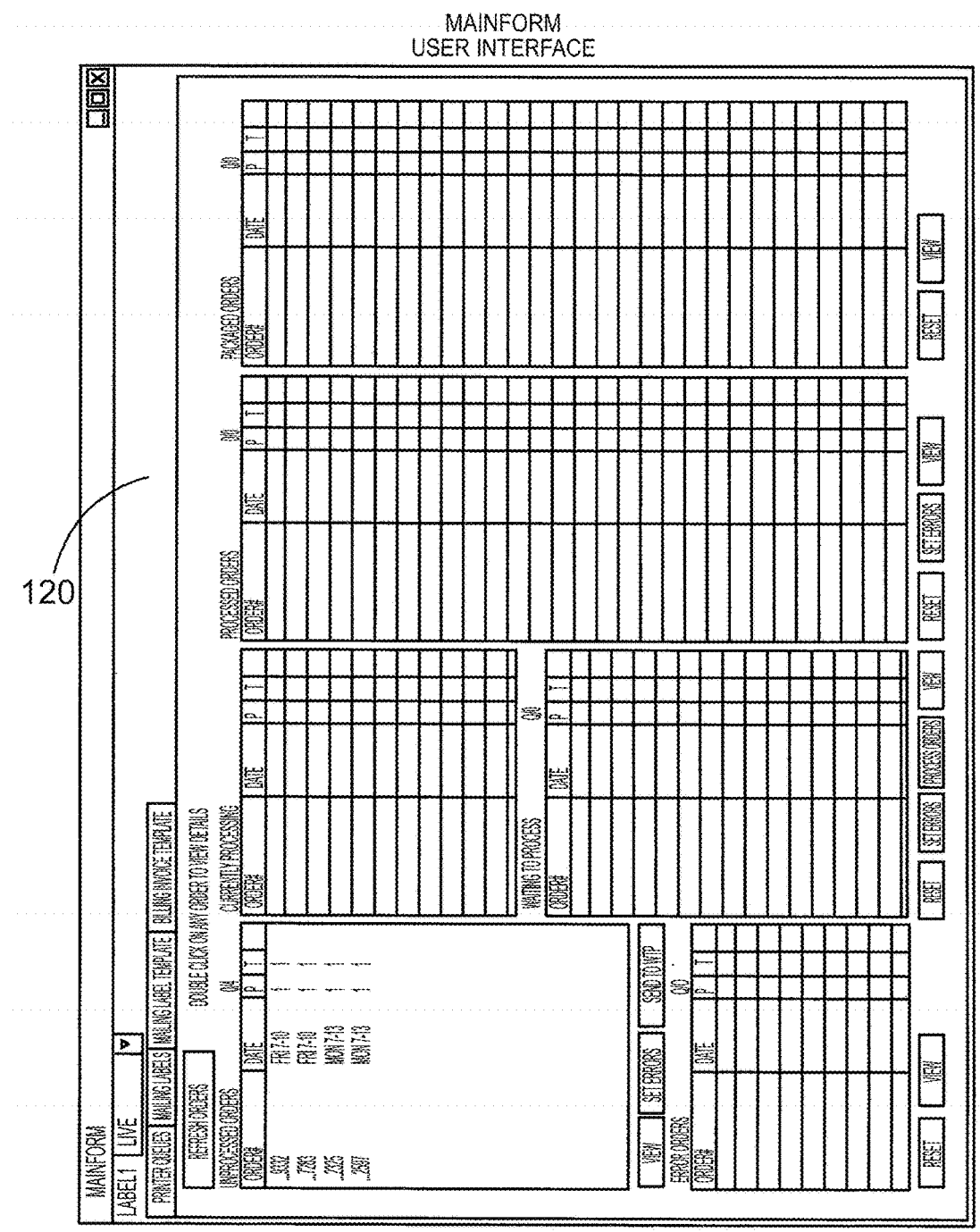
FIG. 15 shows an example of the user interface for Mainform of one embodiment of the method and system of the present disclosure.

FIG. 15 shows an example of the user interface 120 for Mainform 118.

Batched Order Generation 110 begins when the operator selects orders totalling 10 sheets from the Unprocessed Orders queue. By selecting the VIEW function button, the operator initiates a script which generates a "workload number" for the batch and displays the orders on a wide screen monitor in "10-up" format—the way the sticker sheets will print on the roll-fed substrate. Mainform 118 utilizes a "10-up" template created in Adobe Illustrator to generate this display.

The operator checks the color, die-cut and licensing status of each order and then selects the PROCESS ORDERS function button from the Waiting to Process queue. This initiates a second script, which directs Adobe Illustrator to render the 10 sheets into a "workload file," putting the "artwork" and the "die-cuts" on two separate layers and saving the file in Postscript format (e.g., .ai file format).

Cut and Print Data Generation 112 commences when the operator opens the "workload file" in Adobe Illustrator, which has the Mimaki "Fine Cut" plug-in installed. This plug-in "reads" the Illustrator file's "print" and "cut" layers, and via the "Output to Raster Link" function button, generates an .eps file for each layer and passes the data to the Raster Link application 120.

The operator opens Raster Link 120, selects the "workload file" (now comprised of one .eps for the printing data and one for the cutting data) and initiates sequential "RIP, print and diecut" functions via the "Cut after RIP and print" menu command.

Material Printing, Die-cutting and Trimming 114 commences after Raster Link 120 finishes "RIPping" the Postscript data generated by Fine Cut. It sends "machine data" to the printer to control the operation of the print head and the cutting head. First, the artwork is printed. The operator can control the quality and speed of the output with the resolution, "number of passes" and "print head speed" settings in Raster Link 120. Smearing of the ink is prevented by the use of internal heaters, which quick-dry the solvent-based inks. After printing finishes, the "carriage" switches from the print head to the cutting head, roller pressure settings are adjusted and heaters are turned off. The material is automatically rolled back to the printing origin point and die-cutting commences. Accurately registered "contour die-cutting" is achieved through the cutting head's laser pointer system, which detects the "x" and "y" coordinates of register marks around the perimeter of the image area.

After the material is printed and die-cut, the machine's automatic sheet trimmer cuts the sheet off the roll and it drops into the media catch bin. The operator places the sheet on the viewing booth and checks the content and color of the output against the visual display of the workload. A VIEW button under the Processed Orders queue allows the operator to select the processed workload and display it.

The operator then secures the material to the surface of a drafting table and cuts it into ten letter-sized sheets, utilizing a parallel straightedge for the horizontal cuts and a T-square for the vertical cuts. The sheets are stacked on the Packaging Table, awaiting the final stage of production.

Order Packaging and Shipping 116 commences with the piling of empty mailing envelopes on the Packaging Table (next to the stacked vinyl sheets). The operator selects the "Mailing Label" tab from the Mainform 118 application, and uses the barcode scanning gun 122 to scan the barcode on each of the ten sticker sheets. Mainform 118 prints out a "templated" Packing Slip 124 and a Mailing Label 126, populating the "address, cost, mail service, order number and number of sheets" fields with the barcode-encoded data captured by the website at the time of purchase.

The sticker sheets and packing slip are inserted into the envelope 128, the shipping label 126 is affixed to the envelope 128 and the operator puts the envelope into one of four compartments in the "To Be Metered" bins (each compartment represents one of two destinations and one of two weight classes).

After all workloads for the day have been printed, die-cut, trimmed and inserted—the envelopes 128 are metered for postage 130 by "destination and weight" and placed in a "To Be Mailed" bin 134. Before mailing, the barcodes on the shipping labels are scanned 132. The data is sent to a Reconciliation Sheet, which the operator prints off and compares with data from the postal meter. This verifies that the number of orders processed equals the number to be shipped.

The envelopes are brought to a Postal Station for mailing. This concludes the Printing and Fulfillment 116 segments of the Sticker Production System.

Figure 16:
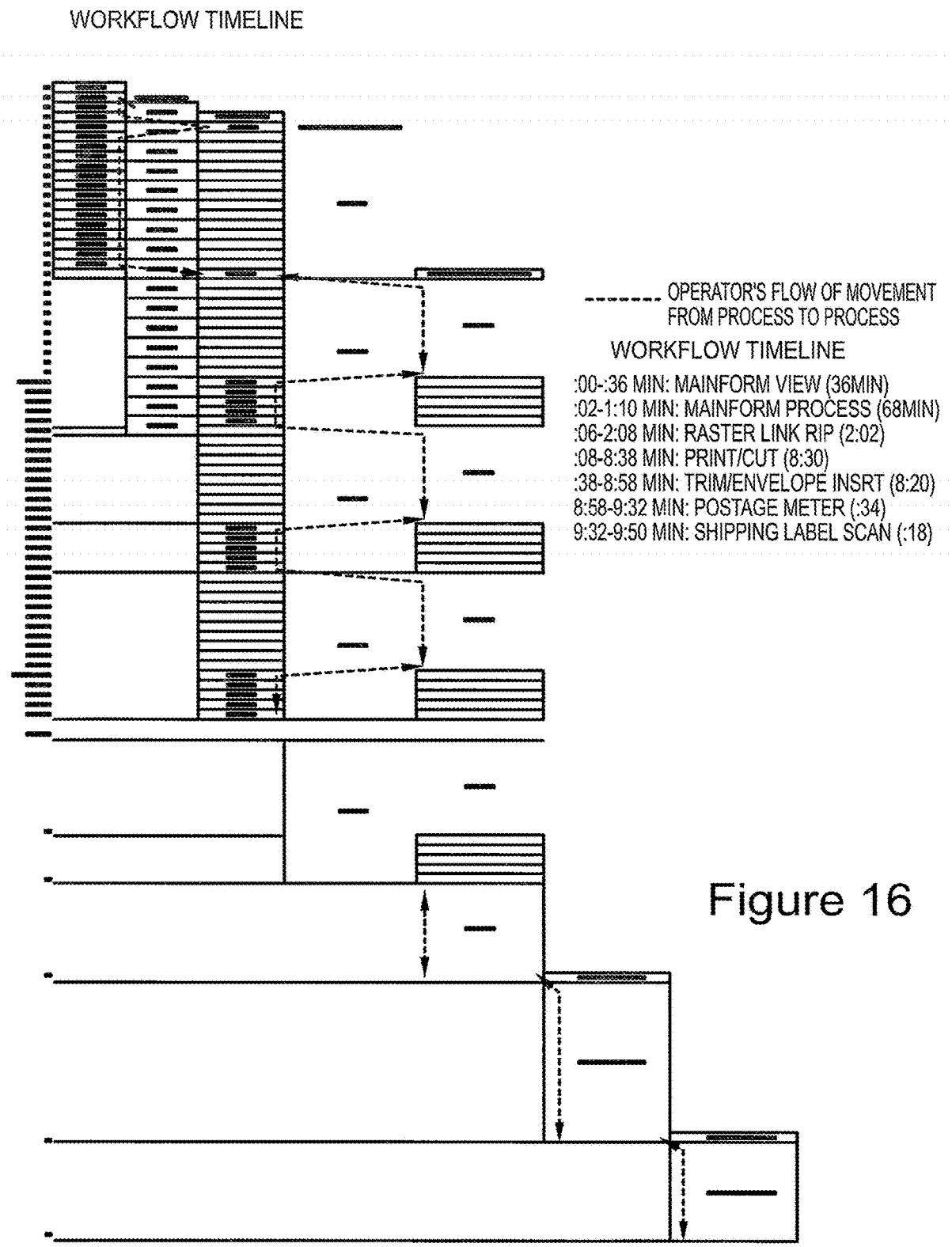
FIG. 16 illustrates the workflow timeline of one embodiment of the method and system of the present disclosure.

Although the four stages of the Printing and Fulfillment workflow have been described sequentially, they actually occur concurrently, which maximizes sticker production. The queues that perform workload viewing and processing, Raster Link RIPping and workload printing are therefore idle for only a small amount of time over the course of processing consecutive workloads. FIG. 16 illustrates this.

Print times are relatively fixed. Bi-directional "12-pass" printing, at a resolution of 540×1080 progresses at the speed of 4 linear inches (by 60" wide) per minute. A 10-sheet workload prints in about 8 minutes. Raster Link RIPs a workload in 2 minutes, but it does so at the same time as the previous workload is printing. So, no printing or cutting time is "lost" to RIP time.

Production throughput is governed by two main factors: (a) Path-generation time in Mainform (which, itself, is determined by two other factors); and (b) Path-cutting time at the printer/plotter.

Since each sticker is die-cut individually, total die-cutting time is determined by the number of stickers in the workload and the complexity of the die-cut path. More complex paths take longer to generate and cut. This explains the variability of Mainform "Processing" times and Raster Link "RIPping/Printing/Die-cutting" times mentioned below.

Path complexity is a function of the number of points per path and the number of curved (versus angular) segments on the path. Since the media feed motor and the cut-head carriage motor must move for each point on a path, the quickest cutting paths are those with the fewest number of points and the fewest angular segments.

Achieving a balance between an aesthetically pleasing die-cut (one that follows the contour of the artwork) and one that cuts quickly (maximizing throughput) required testing various path shapes and complexities. After simplifying die-cut paths to as few points as possible (15-50 points, depending upon the artwork's contours) while maintaining fidelity to those contours, it was determined that the achievable time per sticker die-cut is between 5-8 seconds. For an "average" sticker sheet containing 15 stickers, a workload of 10 sheets (150 stickers) takes 20 minutes to cut (1200 seconds-8 sec/die-cut×150 die-cuts).

The die-cut paths are initially generated using Illustrator's "Live Trace" feature. An artist optimizes the path by reducing the number of points and angular segments via the Object/Path/SIMPLIFY command.

Since there is a machine limitation for "art-to-die-cut" registration accuracy (0.5 mm), it was necessary to limit the amount of user-defined scaling that could be applied to a sticker so that this tolerance would not be compromised.

Testing resulted in a decision to limit the minimum "scaled" sticker size to 1" in height with a die-cut "offset" of 0.75 mm (the distance (in mm) from the edge of the artwork to the edge of the die-cut). At this size, die-cut misregistration can occur, but the die-cut will not cut through the artwork.

This meant creating die-cut "offsets" in the original artwork of 2½ mm (art is created at 4" high).

The following times were measured during multiple tests of sample 10-sheet workloads: (a) Mainform "Viewing/Checking": 2 min per workload; (b) Mainform "Processing": 4-12 minutes per workload; (c) Raster Link RIPping: 2 minutes per workload; (d) Printing: 8 minutes per workload; (e) Die-cutting: 10-20 minutes per workload; (f) Trimming/scanning/envelope insertion/labelling: 20 minutes per workload; (g) Postage metering: 2 minutes per workload; (h) Shipping label scanning: 1 minute per workload.

Process "totals" per 10-hour shifts: (a) Mainform "Viewing/Checking": 34 minutes; (b) Mainform "Processing": 68 min-3.5 hours; (c) "RIPping"/printing/die-cutting: 8 hours; (d) Trimming/scanning/envelope insertion/labelling: 5.75 hours; (e) Postage metering: 34 minutes; (f) Shipping label scanning: 17 minutes.

If one were to process each workload in its entirety before starting the next one, it would take 60-70 minutes, allowing only 10 workloads (100 sheets) to be produced in a 10-hour shift. The "concurrent-processes" workflow of the present disclosure enables 17 workloads (170 sheets) to be produced in the same amount of time.

Figure 17:
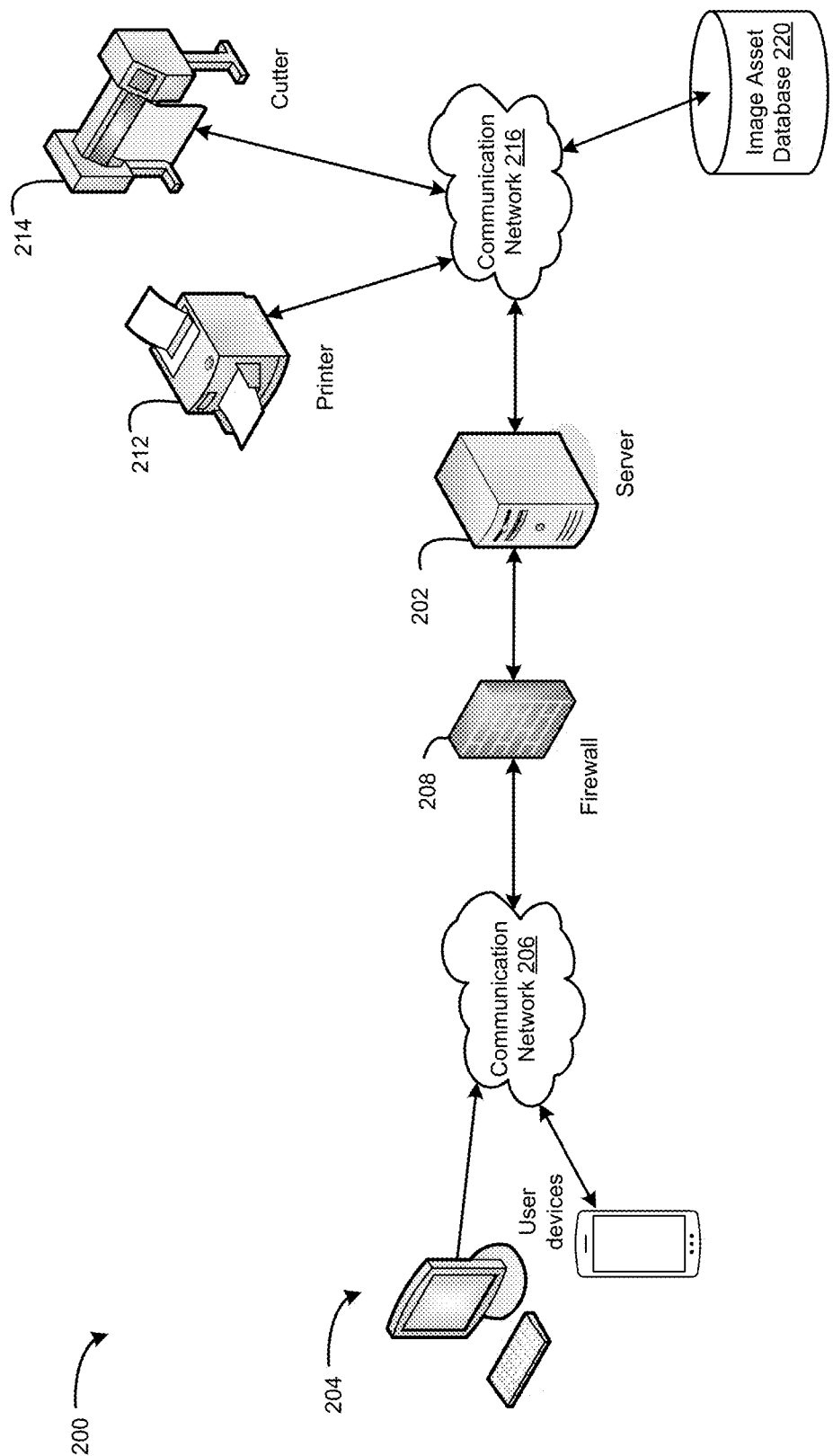
FIG. 17 is a block diagram of a system for making custom printed products in accordance with an example embodiment of the present disclosure.

Reference is next made to FIG. 17 which illustrates in block diagram form a system 200 for making custom printed products in accordance with an example embodiment of the present disclosure. The system 200 comprises a server 202 which communicates with user devices 204 via a communications network 206, such as the Internet. The server 202 is typically located behind a firewall 208. The server 202 is coupled to one or more printers 212 (only one of which is shown in FIG. 17), one or more cutters 214 (only one of which is shown in FIG. 17), and an image asset database 220 in which image assets are stored via a communications network 216, such as a wired or wireless local area network (LAN). In some embodiments, the printer 212 and cutter 214 may be integrated within a single machine. In other embodiments, the printer 212 and cutter 214 are separate machines with the printed product being passed from the printer 212 to the cutter 214 via automated or manual means. The communications networks 206, 216 may comprise one or more communications networks of one or more different types. The user devices 204 may be personal computers, tablets, smartphones or a combination thereof. Users interact with the server 202 via a website that provides a user interface. The user interface is typically a series of webpages on the website that are connected via scripting or the like. The website is access and displayed via a browser on the user device 204.

Figure 18:
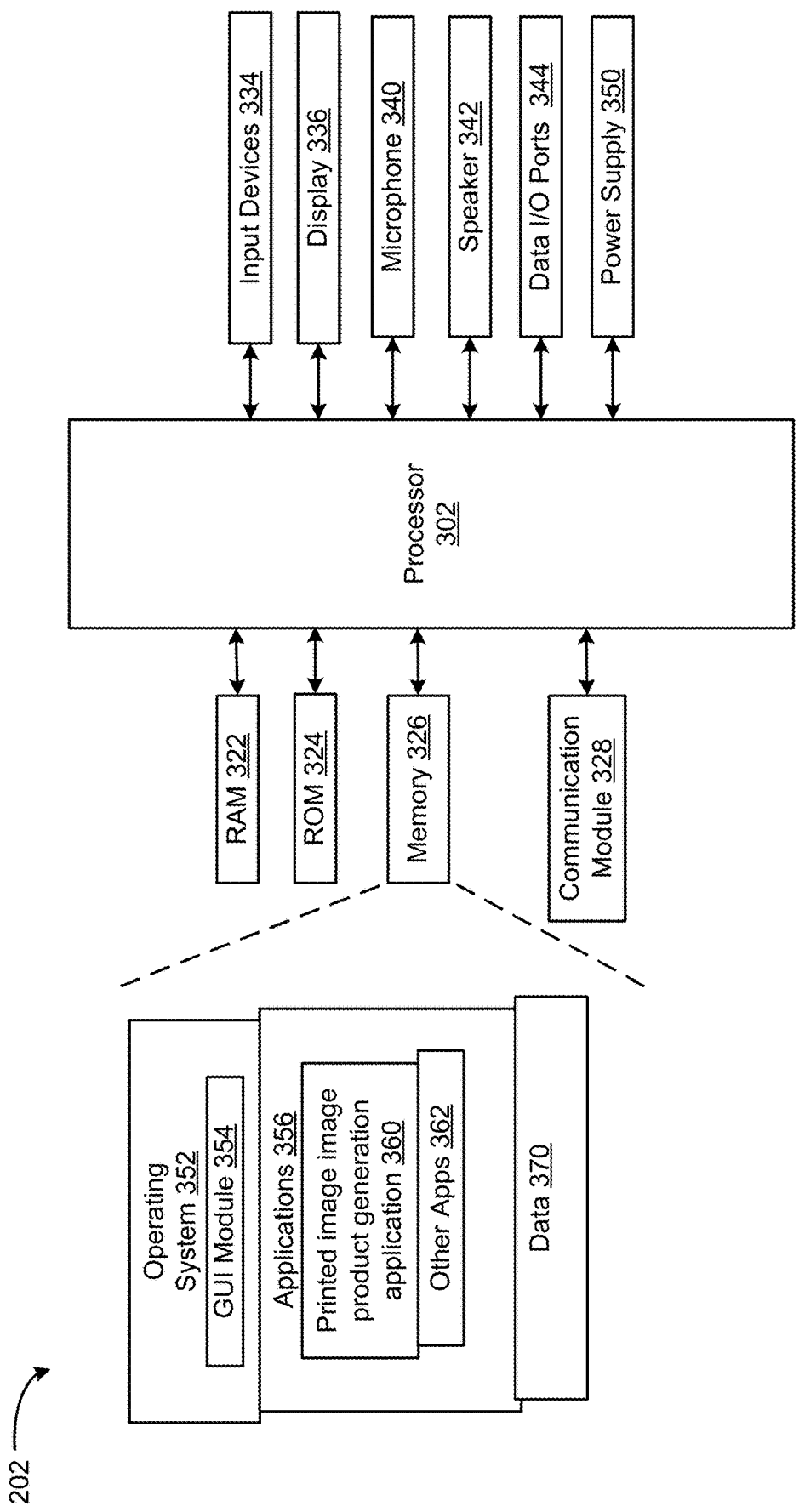
FIG. 18 is a block diagram of a server in accordance with an example embodiment of the present disclosure.

Reference is next made to FIG. 18 which illustrates in block diagram form an example embodiment of the server 202 in accordance with the present disclosure. The server 202 comprises at least one processor 302 (such as a microprocessor) which controls the overall operation of the server 202. The processor 302 is coupled to a plurality of components via a communication bus (not shown) which provides a communication path between the components and the processor 302.

The processor 302 is coupled to RAM 322, ROM 324, persistent (non-volatile) memory 326 such as flash memory, and a communication module 328 for communication with the user devices 204, printers 212, cutters 214 and asset database 220. The server 202 may also comprise input devices 334 such as a keyboard, mouse, touchscreen or like, a display 336, a microphone 340 and a speaker 342, one or more data ports 344 such as serial data ports for data I/O (e.g., USB data ports), and a power supply 350. The communication module 328 provides wired and/or wireless communication capabilities. The communication module 328 may allow the server 202 to communicate via one or any combination of LAN, WLAn such as Wi-Fi®, Bluetooth® or other short-range wireless communication protocol such as NFC, IEEE 802.15.3a (also referred to as UltraWideband (UWB)), Z-Wave, ZigBee, ANT/ANT+ or infrared (e.g., Infrared Data Association (IrDA)).

Operating system software 352 executed by the processor 302 is stored in the persistent memory 326 but may be stored in other types of memory devices, such as ROM 324 or similar storage element. The operating system 282 comprises a graphical user interface (GUI) module 354 for user interaction. A number of applications 356 executable by the processor 302 are also stored in the persistent memory 326 including a printed product generation application 360. The memory 326 also stores a variety of data 370. System software, software modules, specific device applications, or parts thereof, may be temporarily loaded into a volatile store, such as RAM 322, which is used for storing runtime data variables and other types of data or information. Communication signals received by the controller 202 may also be stored in RAM 322. Although specific functions are described for various types of memory, this is merely one example, and a different assignment of functions to types of memory may be used in other embodiments.

Figure 19:
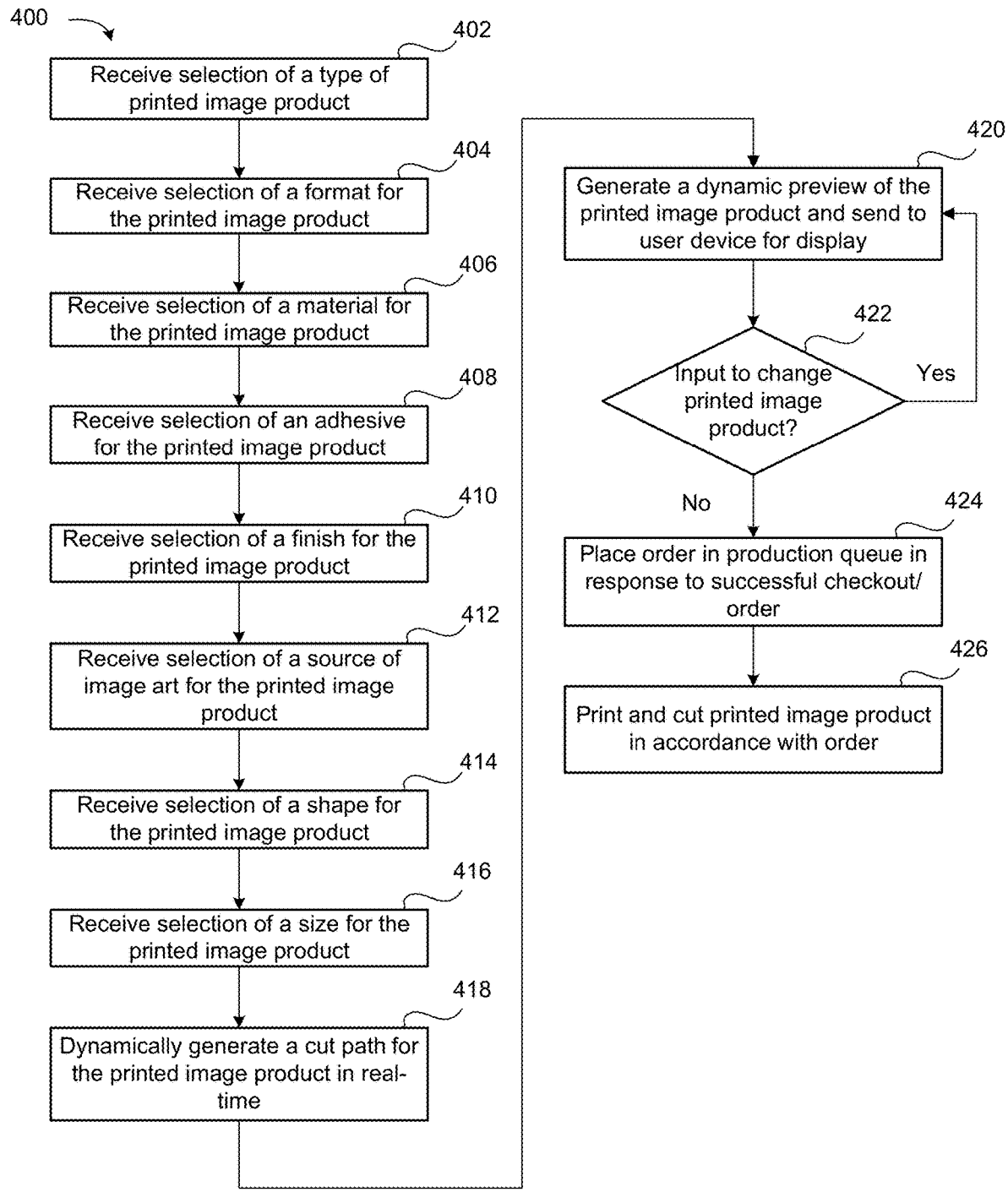
FIG. 19 is a flowchart of a method for making custom printed products in accordance with an example embodiment of the present disclosure.

FIG. 19 is a flowchart of a computer-implemented method 400 for making custom printed products in accordance with an example embodiment of the present disclosure. At least parts of the method 400 are carried out by a processor of the server 202 of the system 200 or a computer connected to the server 202.

At operation 402, in response to input to create a new printed product received by the website of the system 200 from a user on a user device 204, the user is prompted by a user interface of the website to select a type of printed product from a plurality of printed product types. The plurality of printed product types may comprise any combination of stickers, labels, decals, temporary tattoos, iron-ons, patches, clings, magnets, badges, etc.

The user on the user device 204 selects a type of printed product from the plurality of printed product types via interaction with the user interface of the website, for example, by selecting an onscreen button or other user interface element corresponding to the desired type of printed product. The selected type of printed product is received by the server 202.

At operation 404, the user on the user device 204 may be prompted to select a format from a plurality of printed product formats. The plurality of printed product formats from which the user may select a format, when prompted, are dependent on the selected printed product type from operation 402. A table illustrating the available printed product formats for each of a plurality of printed product types in accordance with one example embodiment is provided below:

TABLE 1

| Printed product formats | |
| --- | --- |
| Printed product Type | Formats |
| Stickers | Pages (single design), Pages (multiple designs), rolls, kiss-cut singles, die-cut Singles, |
| Labels | Pages (single design), Pages (multiple designs), rolls, kiss-cut singles |

TABLE 1-continued

| Printed product formats | |
| --- | --- |
| Printed product Type | Formats |
| Decals | Large Format |
| Temporary tattoos | Pages (single design), Pages (multiple designs), kiss-cut singles |
| Iron-ons | Pages (single design), Pages (multiple designs) |
| Patches | Die-cut Singles |
| Clings | Pages and Large Format |
| Magnets | Pages (multiple designs), die-cut singles |
| Badges | N/A |

The user on the user device 204, when prompted, selects a format of the printed product from the plurality of printed product formats via interaction with the user interface of the website, for example, by selecting an onscreen button or other user interface element corresponding to the desired format of the printed product. The selected format of the printed product is received by the server 202.

At operation 406, the user on the user device 204 may be prompted to select a material from a plurality of printed product materials. The plurality of printed product materials from which the user may select, when prompted, are dependent on the selected printed product type from operation 402 and the selected format from operation 404. Example materials include, but are not limited to, white vinyl, clear vinyl, paper, white biaxially-oriented polypropylene (BOPP), clear BOPP, silver foil, and gold foil. The user on the user device 204, when prompted, selects a material of the printed product from the plurality of printed product materials via interaction with the user interface of the website, for example, by selecting an onscreen button or other user interface element corresponding to the desired printed product material. The selected material of the printed product is received by the server 202.

At operation 408, the user on the user device 204 may be prompted to select a type of adhesive from a plurality of printed product adhesives. The plurality of printed product adhesives from which the user may select, when prompted, are dependent on the selected printed product type from operation 402, the selected format from operation 404, and the selected material from operation 406. Example adhesives include, but are not limited to, permanent or removable. The user on the user device 204, when prompted, selects an adhesive of the printed product from the plurality of printed product adhesives via interaction with the user interface of the website, for example, by selecting an onscreen button or other user interface element corresponding to the desired printed product adhesive. The selected adhesive of the printed product is received by the server 202.

At operation 410, the user on the user device 204 may be prompted to select a type of finish from a plurality of printed product finishes. The plurality of printed product finishes from which the user may select, when prompted, are dependent on the selected printed product type from operation 402, the selected format from operation 404, and the selected material from operation 406. Example finishes include, but are not limited to, glossy, semi-glossy and matte. The user on the user device 204, when prompted, selects a finish of the printed product from the plurality of printed product finishes via interaction with the user interface of the website, for example, by selecting an onscreen button or other user interface element corresponding to the desired printed product finish. The selected finish of the printed product is received by the server 202.

At operation 412, the user on the user device 204 is prompted to select a source of image art for the printed product. The source of the image art is either an uploaded image or an image selected from the image asset database 220. The uploaded image is typically restricted to a raster image of a supported image file image format, such as JPG, PNG or GIF but may permit one or more vector graphics formats, such as Scalable Vector Graphics (SVG) or equivalent. The images in the image asset database 220 are typically restricted to vector graphics, such as Scalable Vector Graphics (SVG) or equivalent, but may include raster images, such as stock digital images.

When an uploaded image is selected as the source of the image art, the user is prompted to upload the image from local storage/memory of the user device 204. The image is uploaded to the server 202 from a user device 204 via the communications network 206 in response to user interaction on the user device 204. The uploaded image for the printed product is then received by the server 202 via the communication module 328. Conversely, when the image asset database 220 is selected as the source of the image art, the user is prompted to select an image from the image asset database 220. When selecting an asset from the image asset database 220, the website may provide a search interface for searching for images via inputting a textual description of the desired image and/or selectable image tags/categories, or other selection means. The image selection for the printed product is received by the server 202 via the communication module 328.

At operation 414, the user on the user device 204 is prompted to select a shape from a plurality of printed product shapes. The plurality of printed product shapes from which the user may select, when prompted, are dependent on the selected printed product type from operation 402 and the selected format from operation 404. The plurality of printed product shapes comprises a custom, freeform, content-based shape (e.g., image-based shape) or a plurality of template-based shapes. Example template-based shapes include square/rectangle, rounded corners, circle/oval/round, fancy shape, heart shape, scallop shape, starburst shape and others. The shape selection for the printed product is received by the server 202 via the communication module 328.

At operation 416, the user on the user device 204 may be prompted to specify a size of the printed product. When the shape is a custom shape based on the content of the image asset to be used in the printed product, the printed product has locked, fixed proportions and the user is prompted to specify one of a width or height of the printed product, the other of the width or height being automatically determined based on the fixed proportions of the printed product. When the shape is a template-based shape, the user is prompted to specify a width and height of the printed product. The user interface may allow the user to lock the proportions of the printed product, in which case the user need only specify one of the width or height of the printed product. The size selection for the printed product is received by the server 202 via the communication module 328.

The size prompt may be part of a dedicated window or dialog box displayed on the user device 204. Alternatively, a default size may be used and the user may be able to change the size from the default size via a size panel 504 of an editor graphical user interface that is displayed on the user device 204 via the browser.

At operation 418, the processor dynamically generates a cut path for the printed product in real-time. The cut path may be dynamically generated as described herein. FIGS. 20a, 20b, 21a and 21b illustrate methods of determining a cut path in accordance with example embodiments of the present disclosure, and are described below. The cut path may be a die-cut path or a kiss-cut path depending on the type and/or format of the printed product. A die-cut is a cut that extends through the printed product and a backing of the printed product. A kiss-cut is a cut that extends through the printed product but not a backing of the printed product. A kiss-cut allows the printed product, such as a sticker, to be easily peeled away from the backing. Multiple kiss-cut printed products can be include on a page or sheet.

At operation 420, the processor generates a dynamic preview of the printed product in real-time. The dynamic preview illustrates the image for the printed product and the cut path. The dynamic preview of the printed product is sent to the user device 204 for display thereon via the communication module 328. The dynamic preview is provided as part of the editor graphical user interface (GUI) displayed on the user device 204 via the browser.

Figure 22A:
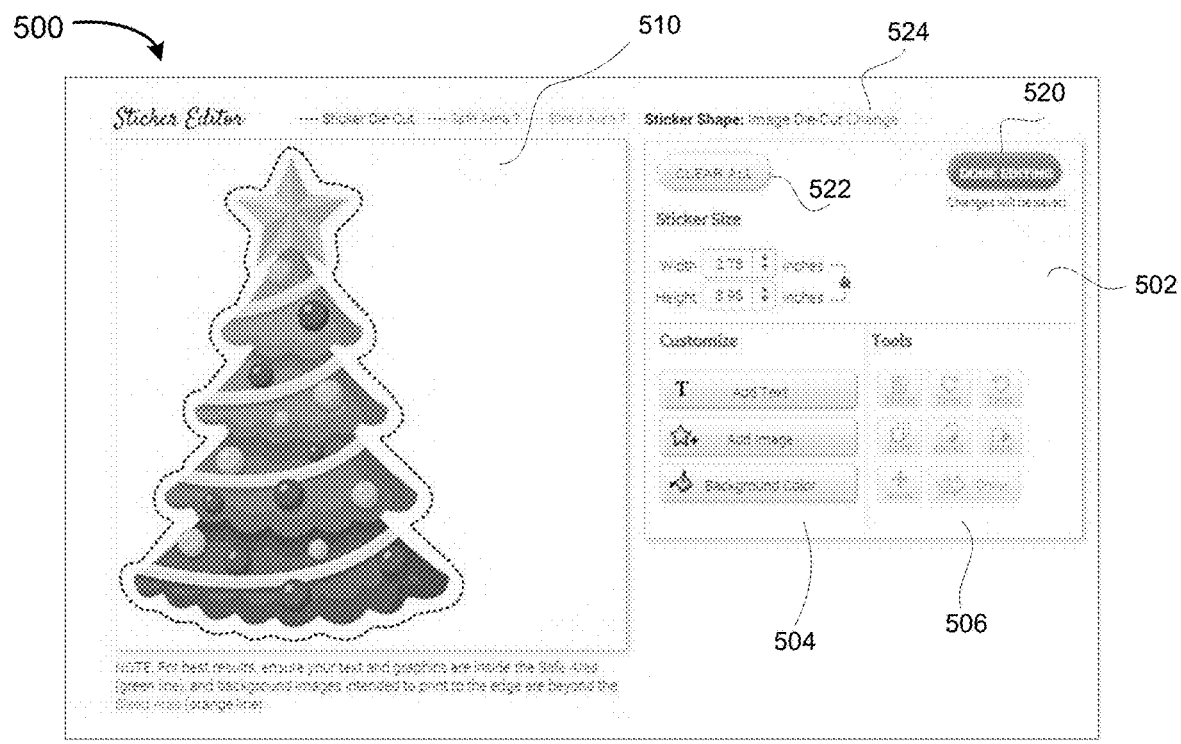
FIGS. 22a and 22b illustrate example screens of an editor graphical user interface for making a sticker with a custom shape in accordance with an example embodiment of the present disclosure.

FIG. 22a illustrates an example screen 500 of the editor GUI for making a sticker with a custom, content-based shape. The screen 500 comprises a size panel 502 with input fields and increase/decrease buttons for setting the size of the printed product, a customize panel 504, and a tools panel 506. The customize panel 504 comprises onscreen buttons for adding text to the printed product, adding an image (e.g., a second or subsequent image) to the printed product by either uploading an image or selecting an image from the image asset database 220, and a button for adding background color of the printed product. The screen 500 also comprises a preview panel for presenting a dynamic, real-time preview of the printed product based on the current values input in the user interface. The image and a cut-line surrounding the image, such as a die-cut line in the illustrated screen 500, are displayed as part of the real-time preview. In FIG. 22a, the image of the printed product is a Christmas tree and a custom die-cut based on the shape of the tree has been dynamically generated. This dynamically generated die-cut is shown in the preview panel 510 of FIG. 22a.

Figure 22B:
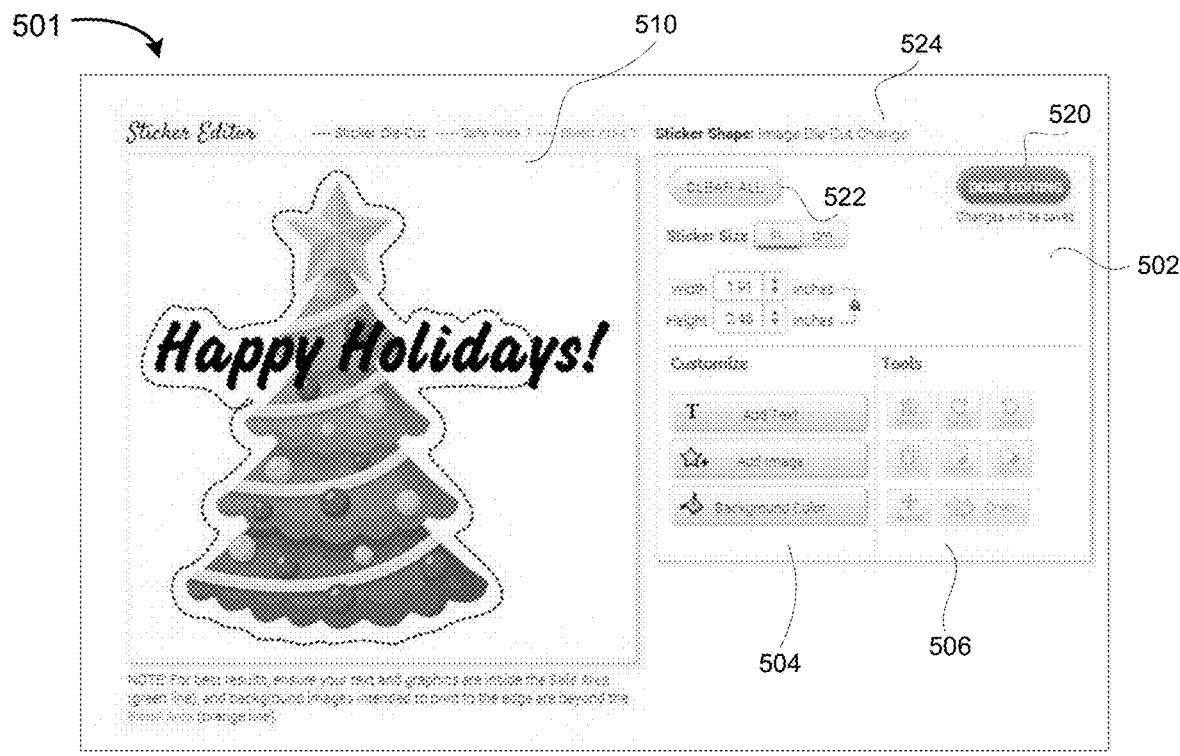

If images and text are added to the printed image product to made, the shape of the printed image product is dynamically changed and updated, with the new shaped being dynamically changed and updated in the preview panel 510 so that the user can preview the product, including its shape, before ordering. In FIG. 22b, the text "Happy Holidays!" has been added to the printed product to accompany the image of the Christmas tree from FIG. 22a and a custom die-cut based on the shape of the tree and the text "Happy Holidays!" has been dynamically generated. This dynamically generated die-cut is shown in the preview panel 510 of FIG. 22b.

To change the size of the printed product, the size panel 504 is used. The user can also set the relative position of the images and text of the printed image product via interaction with the image assets (e.g., images, text) in the preview panel 510. The dynamic editing and previewing of the screen 500 is advantageous in the customization of the printed image product.

The screen 500 also comprises a "Done Editing" button 520 and a "Clear All" button 522. The "Done Editing" button 520 which, when selected, invokes an order GUI screen which allows the user to specify a quantity of the printed image product, specify a name for the printed image product, specify special instructions, preview the price of the order, and add the order to a shopping cart. The order GUI may also allow the user to modify some previously defined aspects of the order such as the format and material. The order GUI may also allow the user to define format-specify properties, such as the position of the printed image product on a roll (e.g., up, down, left, right). The "Clear All" button 522 clears the image selection, size information, and any customizations made via the customize panel 504. In other embodiments, the pricing is provided in the editor interface when sufficient information to determine a price is available. The pricing and order information mentioned above may be displayed with the preview. Changes to the order information may be made in the editor interface, for example, on the preview screen or with a slide screen having additional information. For example, the total price may be shown in the editor interface (e.g., in the preview screen) with an option to invoke a slide screen to change the quantity of the items in the order and consequently the total price. Similarly, for a roll or similar item, a default selection may be shown with an option to invoke a slide screen with options to change.

Figure 23:
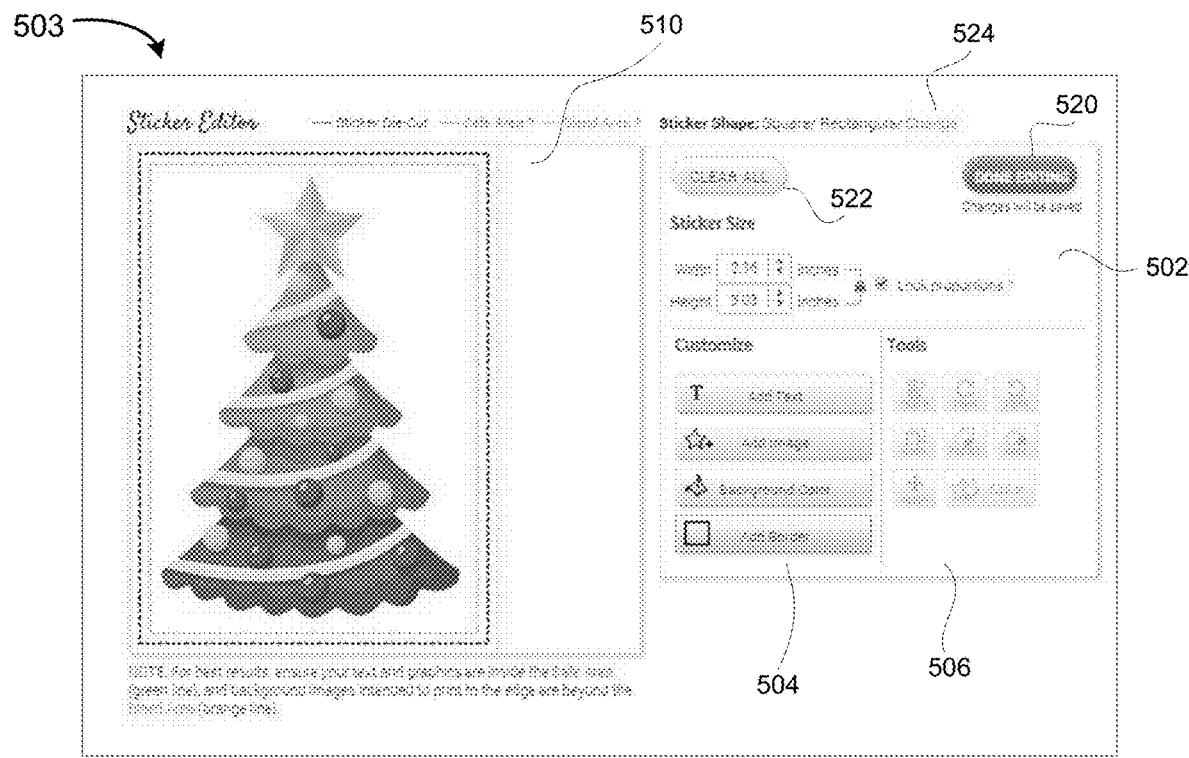
FIG. 23 illustrates an example screen of an editor graphical user interface for making a sticker with a template-based shape in accordance with an example embodiment of the present disclosure.

FIG. 23 illustrates an example screen 503 of the editor GUI for making a sticker with a template-based shape. The screen 503 is similar to the screens 500 and 501 with the notable difference that the size panel 502 includes a toggle button for specifying whether the proportions of the printed product are locked, and the customize panel 504 includes a button to add a border. The screen 503, unlike the screens 500 and 501, allows the position of the image within the printed product to be set or repositioned. If images and text are added to the printed product to made, the user can set/reposition the images and text within the printed product to made via interaction with the preview panel 510. However, if images and text are added to the printed product to made, the shape of the printed product does not automatically change unlike in the screens 500 and 501. To change the shape, a new template must be selected via the editor GUI. In the shown screen, a link 524 can be selected to invoke the shape selection user interface from operation 414. To change the size, the size panel 504 must be used. Although the shape does not automatically change in the screen 503, the preview panel 510 nevertheless provides a dynamic, real-time preview of the printed product that is dynamically changed and updated in real-time so that the user can preview the product, including its shape, before ordering. The dynamic editing and previewing of the screen 503 is advantageous in the customization of the printed product.

At operation 422, when input to change a parameter of the printed product is received from the editor GUI 500, 501 or 503 (which may be a change to any of the inputs received in operations 402-416), the received input is used to update the dynamically generated cut path and/or dynamic preview. This is an interactive process whereby the dynamically generated cut path and/or dynamic preview are updated based on input from the user of the user device 202 until the order is completed/finalized or cancelled.

At operation 424, in response to completing the order, for example, by checking out via a shopping cart GUI, the order is placed into a production queue.

At operation 426, when the order comes to the top of the production queue, the printed product is printed by the printer 212 and cut by the cutter 214. The printed and cut printed product is then packaged and shipped to the customer. The printer 212 prints the image on a substrate in dependence on the determined or specified and the specified size so that offset so that the printed image has a printed size equal to the received size less the offset. The cutter 214 cuts the substrate in dependence on the cut path.

Figure 20A:
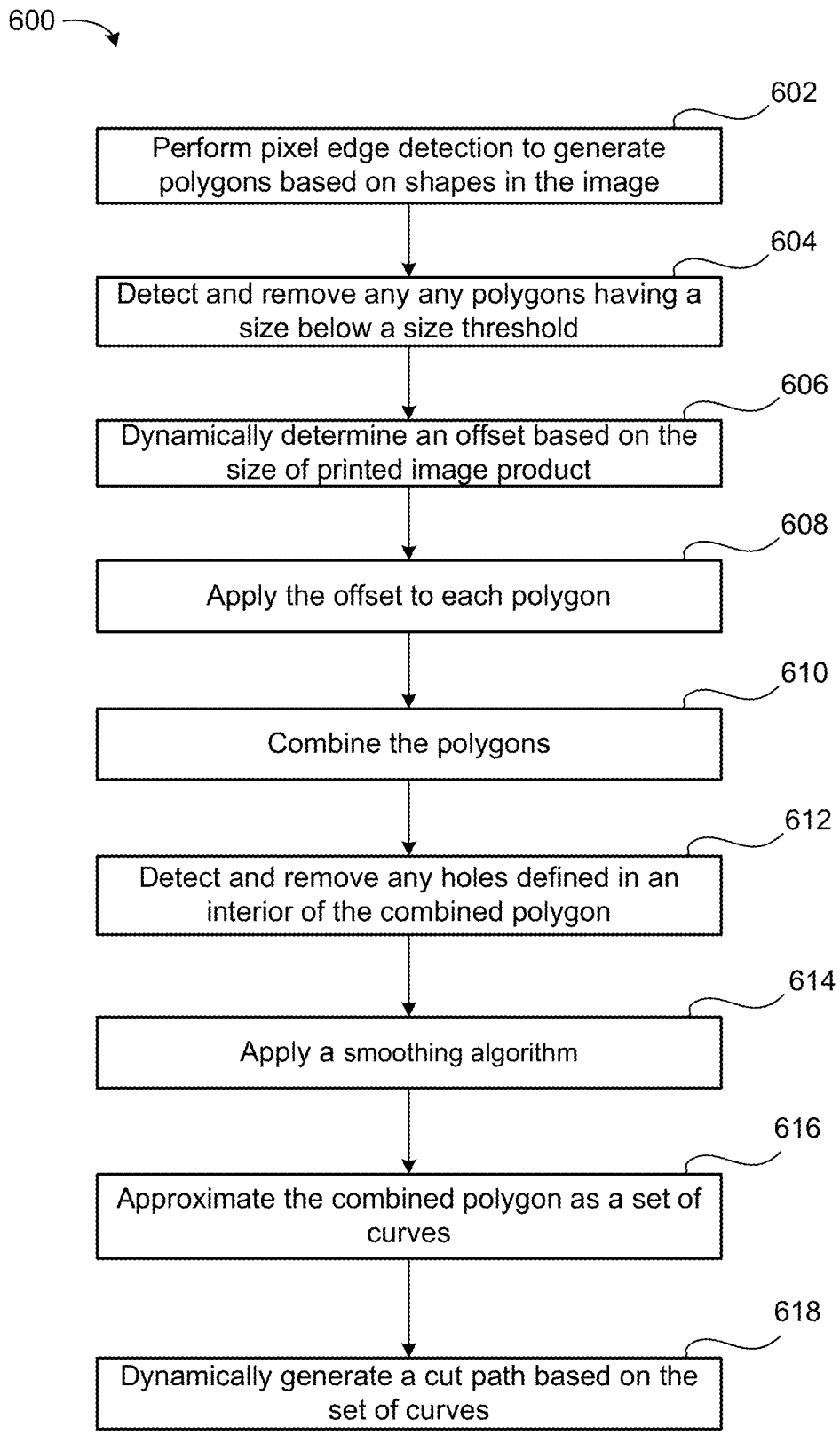
FIGS. 20a, 20b, 21a and 21b are flowcharts of methods for determining a cut path having a custom shape in accordance with an example embodiment of the present disclosure.

FIG. 20a is a flowchart of a method 600 for determining a cut path having a custom, content-based shape in dependence on an uploaded image or an image selected from the image asset database 220 in accordance with one example embodiment of the present disclosure. At least parts of the method 600 are carried out by a processor of the server 202 of the system 200 or a computer connected to the server 202.

At operation 602, the processor performs pixel edge detection on the image to generate a plurality of polygons corresponding to the content of the image. The processor performs edge detection to detect all shapes in the image. In some examples, the processor generates a plurality of polygons corresponding to all closed shapes in the image. A closed shape is a shape that is entirely enclosed by lines.

At operation 604, the processor detects and removes any polygons in the plurality of polygons having a size below a size threshold to generate a reduced set of polygons. This operation may be omitted in some embodiments.

At operation 606, the processor dynamically determines an offset to be applied to each of the polygons in the reduced set of polygons. The size of the offset is dependent on the size of the printed product. Different algorithms or techniques may be used to dynamically determine the offset. A lookup function may be used to determine the offset based on the size of the printed product and a mapping of printed product size to offset size.

In some examples, the size of the offset is fixed at a minimum offset size below a minimum size threshold for the printed product whereas above the minimum size threshold the offset is increased. For example, in one example, printed products having a size of 2" (50.8 mm) or less in either width or height have an offset of 1/16" (1.5875 mm) whereas printed products having a size of more than 2" in either width or height have an offset of 1/8" (3.175 mm). The size of the offset may increase further at further size, for example, for printed products having a size of 12" or more. The size of the offset may be proportional to the size of the printed product above the minimum size threshold.

The operation 606 is optional. In some embodiments, the size offset may be fixed. In some examples, the size of the fixed offset is between 0.2 mm and 4.0 mm. In other examples, the size of the fixed offset is between 0.5 mm and 2.0 mm.

At operation 608, the processor applies the offset to each polygon in the reduced set of polygons to generate a set of modified of polygons.

At operation 610, the processor combines the polygons in the set of modified of polygons to form a combined polygon.

At operation 612, the processor detects and removes any holes defined in an interior of the combined polygon. This operation is optional need not be performed in some embodiments.

At operation 614, the processor applies a smoothing algorithm to the combined polygon. The smoothing algorithm is a polygon smoothing algorithm in some examples.

At operation 616, the processor approximates the combined polygon as a set of one or more curves. The set of one or more curves that define the smoothed polygon is determined by applying spline approximation to the combined polygon in some examples. The spline approximation is Bezier spline approximation and the curves in the set of one or more curves are Bezier curves in some examples.

At operation 618, the processor dynamically generates a cut path for the image product in real-time in dependence on the set of one or more curves and the received size so that the cut path has a shape dependent on the set of one or more curves and a size dependent on the received size. The cut path comprises one or more vector paths, each vector path defining individual cut to be performed by the cutter 214, and is provided to the cutter 214 at the appropriate time via an instruction.

Figure 20B:
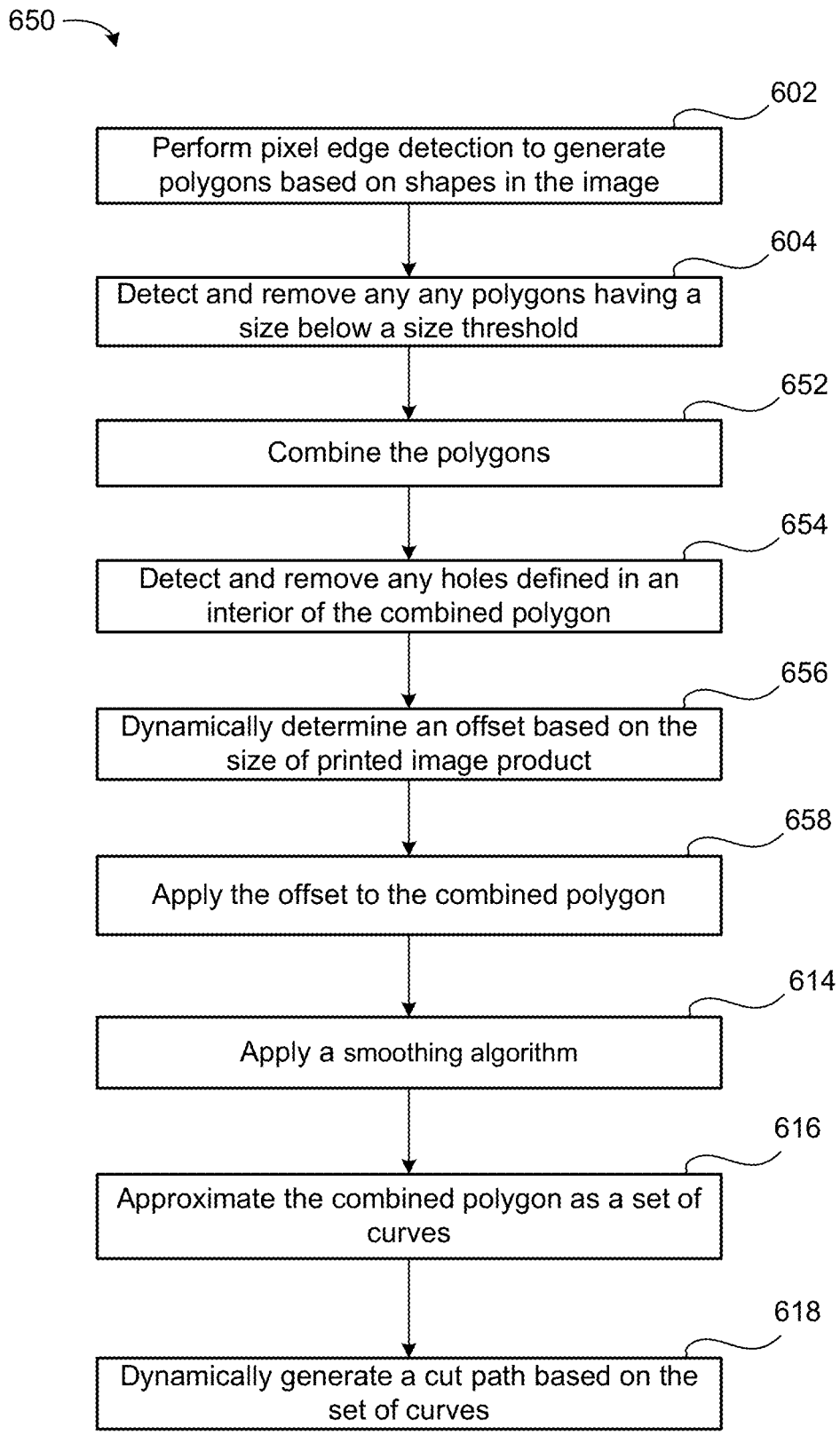

FIG. 20b is a flowchart of a method 650 for determining a cut path having a custom, content-based shape in accordance with another example embodiment of the present disclosure. At least parts of the method 650 are carried out by a processor of the server 202 of the system 200 or a computer connected to the server 202. The method 650 is similar to the method 600 except that the offset is determined and applied after the single, combined polygon has been generated. At operation 652, after detecting and removing any polygons in the plurality of polygons having a size below a size threshold to generate a reduced set of polygons, the polygons are combined to form a single, combined polygon. At operation 654, the processor detects and removes any holes defined in an interior of the combined polygon. At operation 656, the processor dynamically determines an offset to be applied to the combined polygon. At operation 658, the processor applies the offset to the combined polygon.

Figure 21A:
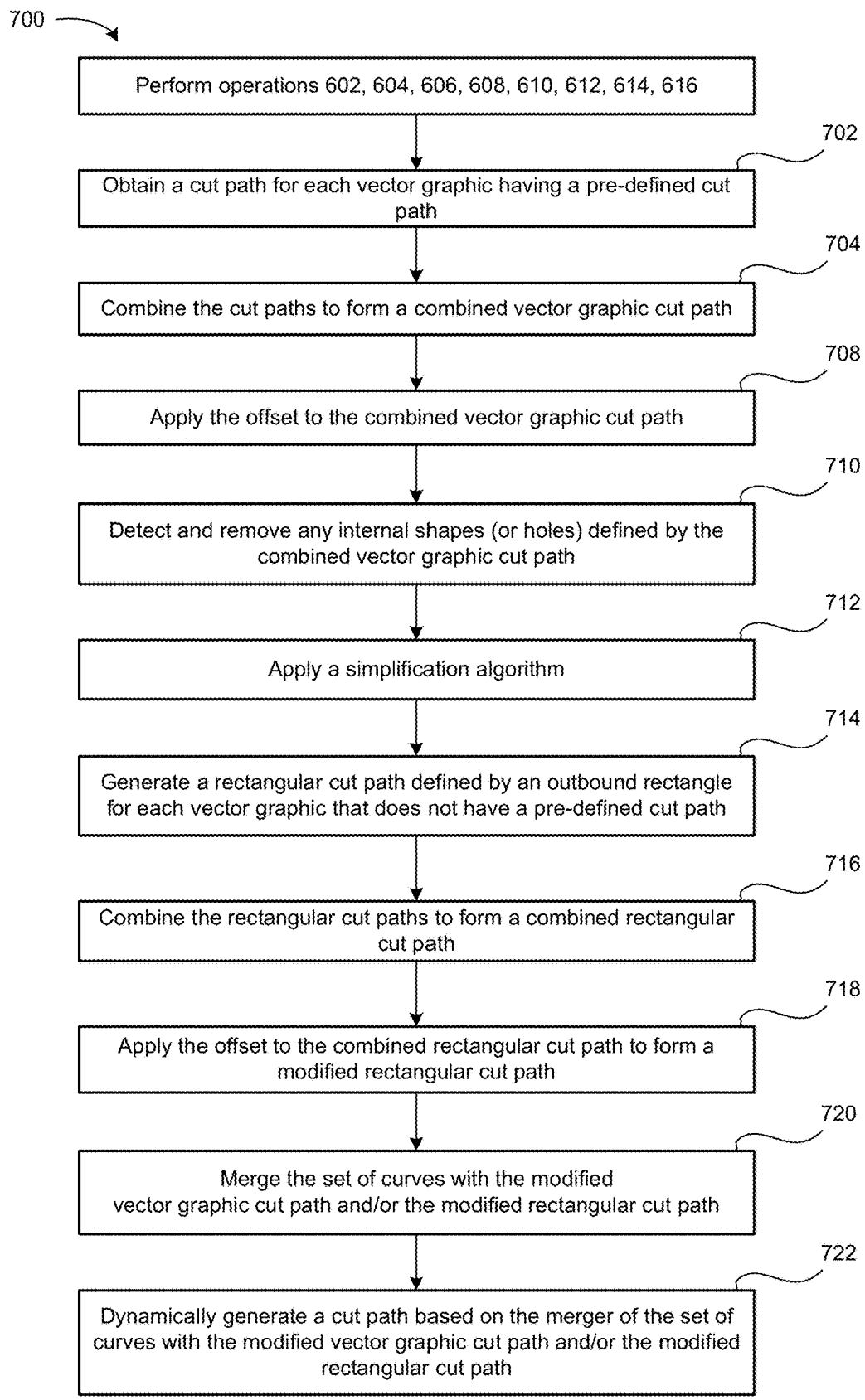

FIG. 21a is a flowchart of a method 700 for determining a cut path having a custom, content-based shape in accordance with a further example embodiment of the present disclosure. At least parts of the method 700 are carried out by a processor of the server 202 of the system 200 or a computer connected to the server 202. The method 700 is similar to the method 600 except that the method 700 is used when more than one vector graphics asset has been uploaded by the user via the user device 204 or selected from the image asset database 220 in addition to an image uploaded or selected from the image asset database 220 by the user.

Operations 602-616 are performed as described above.

At operation 702, the processor obtains a cut path for each vector graphic having a pre-defined cut path (i.e., for vector graphics image object). In some examples, vector graphics images selected from the asset database 200 have a pre-defined cut path whereas vector graphics text added by the user do not have a pre-defined cut path since the vector graphics text is dynamically generated by the system based on user input. Any vector graphics provided by the user would also not have a pre-defined cut path.

At operation 704, the processor combines the cut paths to form a combined vector graphic cut path when more than one cut path is obtained.

At operation 708, the processor applies the offset to the combined vector graphic cut path to obtain a modified vector graphic cut path.

At operation 710, the processor detects and removes any internal shapes (or holes) defined by the combined vector graphic cut path. This operation is optional need not be performed in some embodiments.

At operation 712, the processor applies a simplification algorithm to the modified vector graphic cut path.

At operation 714, the processor generates a rectangular cut path defined by an outbound rectangle for each vector graphic that does not have a pre-defined cut path (i.e., for each vector graphics text object).

At operation 716, the processor combines the rectangular cut paths to form a combined rectangular cut path when more than one rectangular cut path is generated.

At operation 718, the processor applies the offset to the combined rectangular cut path to form a modified rectangular cut path.

It will be appreciated that the operations 702, 704, 708-712 are optional and are only performed when the user has selected one or more vector graphics, and that the selection of one or more vector graphics includes at least one vector graphic having a pre-defined cut path. Conversely, the operations 714-718 are optional and are only performed when the user has selected one or more vector graphics, and that the selection of one or more vector graphics includes at least one vector graphic that does not have a pre-defined cut path.

At operation 720, the processor merges the set of one or more curves with the modified vector graphic cut path (if any) and the modified rectangular cut path (if any) to generate a merged vector cut path.

At operation 722, the processor dynamically generates a cut path for the image product in real-time in dependence on the merged vector cut path and the received size so that the cut path has a shape dependent on merged vector cut path and a size dependent on the received size. The cut path comprises one or more vector paths, each vector path defining individual cut to be performed by the cutter 214, and is provided to the cutter 214 at the appropriate time via an instruction.

Figure 21B:
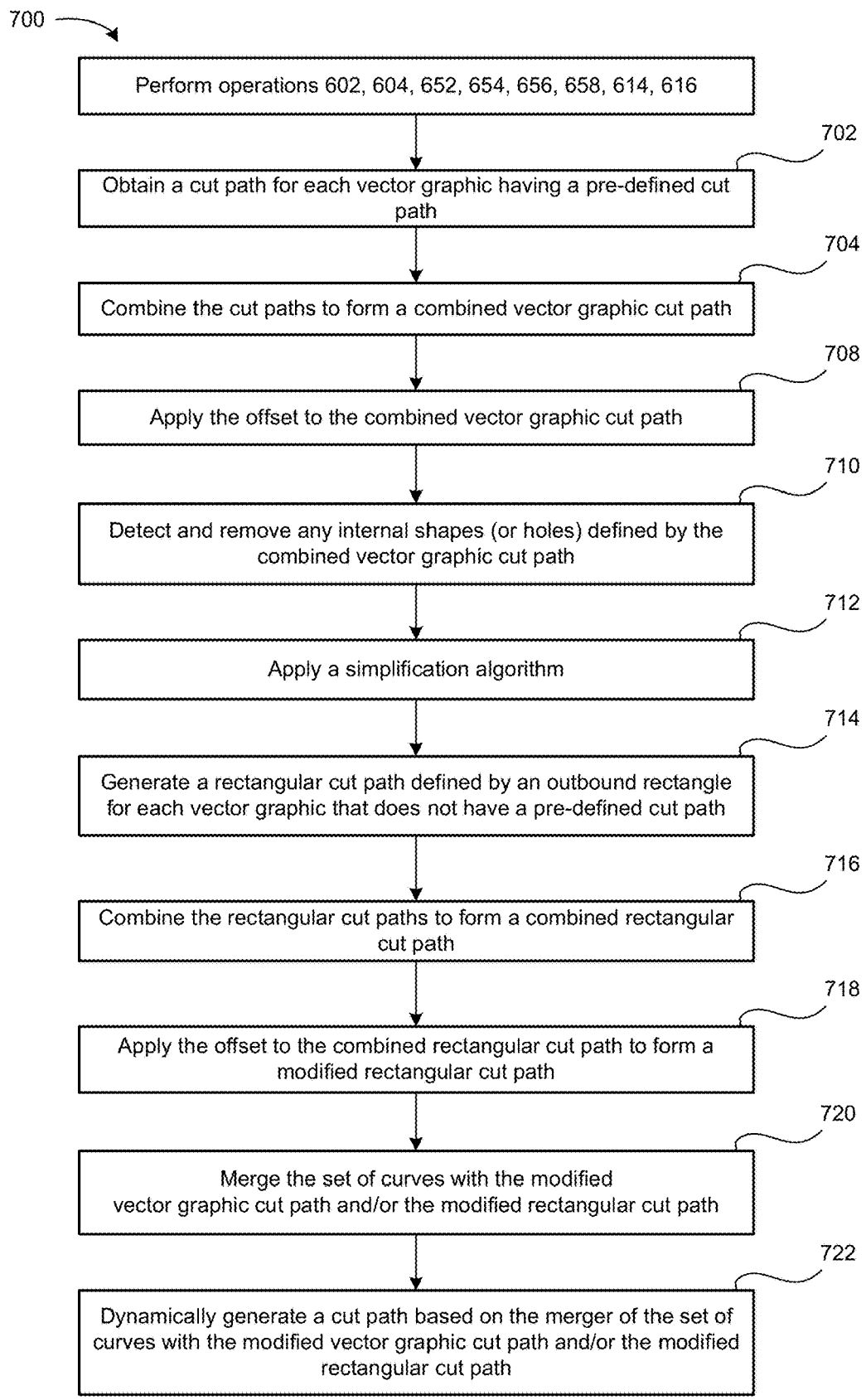

FIG. 21b is a flowchart of a method 750 for determining a cut path having a custom, content-based shape in accordance with yet a further example embodiment of the present disclosure. At least parts of the method 750 are carried out by a processor of the server 202 of the system 200 or a computer connected to the server 202. The method 750 is similar to the method 650 except that the method 750 is used when more than one vector graphics asset has been uploaded by the user via the user device 204 or selected from the image asset database 220 in addition to an image uploaded or selected from the image asset database 220 by the user.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A computer-implemented method for making a printed product, comprising:
   receiving, via a communication module of the computer, an image for the printed product;
   receiving, via the communication module, a size of the printed product;
   performing pixel edge detection on the image to generate a plurality of polygons corresponding to all shapes in the image;
   detecting and removing any polygons in the plurality of polygons having a size below a size threshold to generate a reduced set of polygons;
   applying an offset to each polygon in the reduced set of polygons to generate a set of modified polygons;
   combining the polygons in the set of modified polygons to generate a combined polygon;
   applying a smoothing algorithm to the combined polygon;
   determining a set of one or more curves that define the smoothed polygon, wherein the set of one or more curves that define the smoothed polygon are determined by applying spline approximation to the combined polygon;
   dynamically generating a cut path for the printed product in real-time in dependence on the set of one or more curves and the received size so that the cut path has a shape dependent on the set of one or more curves and a size dependent on the received size;
   causing a printer to print the image on a substrate material for the image product in dependence on the received size and the offset so that the printed image has a printed size equal to the received size less the offset; and
   causing a cutter to cut the substrate in dependence on the cut path.

2. The method of claim 1, further comprising:
   dynamically determining the offset in dependence on the received size.

3. The method of claim 1, wherein the printed product is chosen from one of a sticker, a label, a decal, a temporary tattoo, an iron-on, a patch, a cling, a magnet, a badge.

4. The method of claim 1, wherein the printed product has a format chosen from a page with a single design, a page with multiple designs, a roll, a kiss-cut, a die-cut or a transfer.

5. The method of claim 1, wherein the cut path is a kiss-cut or a die-cut.

6. The method of claim 1, wherein the spline approximation is Bezier spline approximation and the curves in the set of one or more curves are Bezier curves.

7. The method of claim 1, wherein the smoothing algorithm is a polygon smoothing algorithm.

8. The method of claim 1, further comprising:
   detecting and removing any holes defined in an interior of the combined polygon.

9. The method of claim 1, further comprising:
   generating a dynamic preview of the printed product, the dynamic preview illustrating the image and the cut path;
   sending the dynamic preview of the printed product to a user device for display thereon via the communication module.

10. The method of claim 1, further comprising:
    receiving, via the communication module, selection of one or more vector graphics;
    obtaining a cut path for each vector graphic having a pre-defined cut path;
    combining the cut paths to form a combined vector graphic cut path; and
    applying the offset to the combined vector graphic cut path to obtain a modified vector graphic cut path; and merging the set of one or more curves and the modified vector graphic cut path to generate the cut path of the printed product, wherein the shape of the cut path of the printed product is defined by the result of merging the set of one or more curves and the modified vector graphic cut path.

11. The method of claim 10, further comprising:
detecting and removing any internal shapes defined by the combined vector graphic cut path.

12. The method of claim 10, further comprising:
applying a simplification algorithm to the modified vector graphic cut path.

13. The method of claim 10, further comprising:
determining a rectangular cut path defined by an outbound rectangle for each vector graphic that does not have a pre-defined cut path;
combining the rectangular cut paths to form a combined rectangular cut path;
applying the offset to the combined rectangular cut path to form a modified rectangular cut path; and
merging the set of one or more curves, the modified vector graphic cut path, and the modified rectangular cut path to generate the cut path of the printed product, wherein the shape of the cut path of the printed product is defined by the result of merging the set of one or more curves, the modified vector graphic cut path, and the modified rectangular cut path.

14. The method of claim 1, further comprising:
receiving, via the communication module, selection of one or more vector graphics;
generating a rectangular cut path defined by an outbound rectangle for each vector graphic that does not have a pre-defined cut path;
combining the rectangular cut paths to form a combined rectangular cut path;
applying the offset to the combined rectangular cut path to form a modified rectangular cut path; and
merging the set of one or more curves and the modified rectangular cut path to generate the cut path of the printed product, wherein the shape of the cut path of the printed product is defined by the result of merging the set of one or more curves and the modified rectangular cut path.

15. The method of claim 10, wherein the vector graphics having a pre-defined cut path comprise vector graphic images and the vector graphics not having a pre-defined cut path comprise vector graphic text.

16. The method of claim 1, further comprising:
before performing pixel edge detection on the image, decreasing a resolution of the image from a base resolution to a lower resolution.

17. The method of claim 1, further comprising:
before performing pixel edge detection on the image, applying a filters to the image to reduce an amount of noise and a number of colors in the image.

18. A system for making stickers, comprising:
a computer comprising a memory and a processor coupled to the memory, wherein the memory has executable instructions stored thereon that, when executed by the processor, cause the computer to:
receive, via a communication module of the computer, an image for the printed product;
receive, via the communication module, a size of the printed product;
perform pixel edge detection on the image to generate a plurality of polygons corresponding to all shapes in the image;
detect and remove any polygons in the plurality of polygons having a size below a size threshold to generate a reduced set of polygons;
apply an offset to each polygon in the reduced set of polygons to generate a set of modified polygons;
combine the polygons in the set of modified polygons to generate a combined polygon;
apply a smoothing algorithm to the combined polygon;
determine a set of one or more curves that define the smoothed polygon, wherein the set of one or more curves that define the smoothed polygon are determined by applying spline approximation to the combined polygon; and
dynamically generate a cut path for the printed product in real-time in dependence on the set of one or more curves and the received size so that the cut path has a shape dependent on the set of one or more curves and a size dependent on the received size;
a printer coupled to the computer for printing the image on a substrate in dependence on the received size and the offset so that the printed image has a printed size equal to the received size less the offset; and
a cutter coupled to the computer for cutting the substrate in dependence on the cut path.

19. A computer-implemented method for making a printed product, comprising:
receiving, via a communication module of the computer, an image for the printed product;
receiving, via the communication module, a size of the printed product;
performing pixel edge detection on the image to generate a plurality of polygons corresponding to all shapes in the image;
detecting and removing any polygons in the plurality of polygons having a size below a size threshold to generate a reduced set of polygons;
combining the polygons in the reduced set of polygons to generate a combined polygon;
applying an offset to the combined polygon to generate a modified polygon;
applying a smoothing algorithm to the modified polygon;
determining a set of one or more curves that define the smoothed polygon, wherein the set of one or more curves that define the smoothed polygon are determined by applying spline approximation to the combined polygon;
dynamically generating a cut path for the printed product in real-time in dependence on the set of one or more curves and the received size so that the cut path has a shape dependent on the set of one or more curves and a size dependent on the received size;
causing a printer to print the image on a substrate material for the image product in dependence on the received size and the offset so that the printed image has a printed size equal to the received size less the offset; and
causing a cutter to cut the substrate in dependence on the cut path.

* * * * *